(12) United States Patent
Chen et al.

(10) Patent No.: US 12,278,681 B2
(45) Date of Patent: Apr. 15, 2025

(54) ENCODING METHOD AND DECODING METHOD FOR CHANNEL STATE INFORMATION AND COMMUNICATION DEVICE

(71) Applicant: BEIJING XIAOMI MOBILE SOFTWARE CO., LTD., Beijing (CN)

(72) Inventors: Dong Chen, Beijing (CN); Qin Mu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 18/275,088

(22) PCT Filed: Feb. 1, 2021

(86) PCT No.: PCT/CN2021/074729
§ 371 (c)(1),
(2) Date: Jul. 31, 2023

(87) PCT Pub. No.: WO2022/160353
PCT Pub. Date: Aug. 4, 2022

(65) Prior Publication Data
US 2024/0137093 A1    Apr. 25, 2024

(51) Int. Cl.
*H04B 7/0417*    (2017.01)
*H04B 7/06*    (2006.01)

(52) U.S. Cl.
CPC ......... *H04B 7/0663* (2013.01); *H04B 7/0417* (2013.01); *H04B 7/0626* (2013.01)

(58) Field of Classification Search
CPC ... H04B 7/0663; H04B 7/0417; H04B 7/0626
See application file for complete search history.

(56) References Cited

U.S. PATENT DOCUMENTS

2022/0052827 A1* 2/2022 Vitthaladevuni .... H04B 7/0626

FOREIGN PATENT DOCUMENTS

CN    111641832 A    9/2020

OTHER PUBLICATIONS

Ma et al., "Data-Driven Deep Learning to Design Pilot and Channel Estimator for Massive MIMO", IEEE Transactions on Vehicular Technology, vol. 69, No. 5, May 2020, pp. 5677-5682.
(Continued)

*Primary Examiner* — Rahel Guarino
(74) *Attorney, Agent, or Firm* — Cozen O'Connor

(57) ABSTRACT

An encoding method for channel state information (CSI), performed by a user equipment (UE), includes: encoding, based on a first target CSI compression encoder, a target CSI matrix in a delay domain and an angle domain, to generate a compressed encoded value, in which the first target CSI compression encoder includes N composite convolution layers and one fully-connected layer, each composite convolution layer includes a delay-domain convolution step and an angle-domain convolution step, and the delay-domain convolution step of the first composite convolution layer in the N composite convolution layers is smaller than the angle-domain convolution step of the first composite convolution layer in the N composite convolution layers, where N is a positive integer.

20 Claims, 10 Drawing Sheets encoding, based on a first target CSI compression encoder, a target CSI matrix in a delay domain and an angle domain, to generate a compressed encoded value, wherein the first target CSI compression encoder comprises N composite convolution layers and one fully-connected layer, each composite convolution layer comprises a delay-domain convolution step and an angle-domain convolution step, and the delay-domain convolution step of the first composite convolution layer in the N composite convolution layers is smaller than the angle-domain convolution step of the first composite convolution layer in the N composite convolution layers, where N is a positive integer ⎯ S101

(56) References Cited

OTHER PUBLICATIONS

Liao et al., "CSI Feedback Based on Deep Learning for Massive MIMO Systems", IEEE Access, vol. 7, 2019, pp. 86810-86820.
Indian Patent Application No. 202347055922 Office Action dated Sep. 17, 2024, with English translation 6 pages.
European Patent Application No. 21921953.2 Search Report dated Oct. 1, 2024, 8 pages.
Wen, C-K et al., "Deep Learning for Massive MIMO CSI Feedback" IEEE Wireless Communications Letters, vol. 7, No. 5, Oct. 2018, pp. 748-751.
Chinese Patent Application No. 2021800002823, Office Action dated Dec. 20, 2024, with English translation, 26 pages.

\* cited by examiner

ENCODING METHOD AND DECODING METHOD FOR CHANNEL STATE INFORMATION AND COMMUNICATION DEVICE

CROSS-REFERENCE TO RELATED APPLICATION

This application is a national phase of International Application No. PCT/CN2021/074729, filed on Feb. 1, 2021, the entire content of which is incorporated herein by reference.

TECHNICAL FIELD

The disclosure relates to the field of mobile communications, and in particular, to an encoding method for channel state information (CSI), a decoding method for CSI, and a communication device.

BACKGROUND

A massive multiple-input multiple-output (m-MIMO) antenna system has become a basic part of a wireless communication network. An m-MIMO antenna system includes a large number of antennas, which may provide many advantages of greater capacity and interference suppression, however, such a system also adds complexity. In particular, the m-MIMO technology requires a transmitter to obtain accurate channel state information (CSI). In the implementation, a user equipment (UE) estimates downlink CSI and feeds it back to a network device.

SUMMARY

An encoding method for CSI, provided in a first aspect of the disclosure, is performed by a UE. The method includes:
encoding, based on a first target CSI compression encoder, a target CSI matrix in a delay domain and an angle domain, to generate a compressed encoded value, in which the first target CSI compression encoder includes N composite convolution layers and one fully-connected layer, each composite convolution layer includes a delay-domain convolution step and an angle-domain convolution step, and the delay-domain convolution step of the first composite convolution layer in the N composite convolution layers is smaller than the angle-domain convolution step of the first composite convolution layer in the N composite convolution layers, where N is a positive integer.

A decoding method for CSI, provided in a second aspect of the disclosure, is performed by a network device. The method includes: receiving a compressed encoded value corresponding to a target CSI matrix in a delay domain and an angle domain from a UE; and decoding the compressed encoded value based on a first target CSI decoder to generate an estimated value of the target CSI matrix, in which the first target CSI decoder includes N composite deconvolution layers and one fully-connected layer, each composite deconvolution layer includes a delay-domain convolution step and an angle-domain convolution step, and the delay-domain convolution step of the $N^{th}$ composite deconvolution layer in the N composite deconvolution layers is smaller than the angle-domain convolution step of the $N^{th}$ composite deconvolution layer in the N composite deconvolution layers, where N is a positive integer.

A communication device, provided in a third aspect of the disclosure, includes: at least one processor; and a memory communicatively coupled to the at least one processor; in which the memory is configured to store instructions executable by the at least one processor, and when the instructions are executed by the at least one processor, the at least one processor is caused to perform the encoding method for CSI described.

BRIEF DESCRIPTION OF THE DRAWINGS

The above and/or additional aspects and advantages of the disclosure will become apparent and readily understood from the following description of embodiments taken in conjunction with the accompanying drawings, in which.

DETAILED DESCRIPTION

Figures 1, 2, 3:
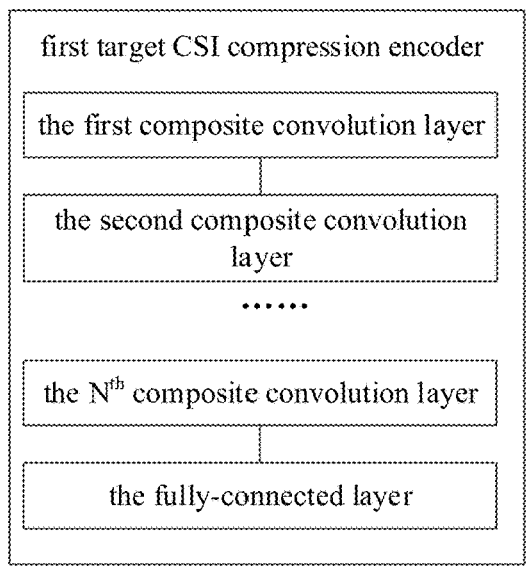
FIG. 1 is a schematic flowchart of an encoding method for CSI, according to embodiments of the disclosure.
FIG. 2 is a schematic diagram of a first target CSI compression encoder, according to embodiments of the disclosure.
FIG. 3 is a schematic flowchart of another encoding method for CSI, according to embodiments of the disclosure.

Embodiments of the disclosure are described in detail below, examples of which are illustrated in the accompanying drawings, in which identical or similar reference numerals indicate identical or similar elements or elements having identical or similar functions throughout. The embodiments described below with reference to the accompanying drawings are exemplary, are intended to be used to explain the disclosure, but should not be construed as a limitation to the disclosure.

FIG. 1 is a schematic flowchart of an encoding method for CSI, according to embodiments of the disclosure. The encoding method for CSI is performed by a UE. As illustrated in FIG. 1, the encoding method for CSI includes the following step.

S101, a target CSI matrix in a delay domain and an angle domain, is encoded based on a first target CSI compression encoder to generate a compressed encoded value, in which the first target CSI compression encoder includes N composite convolution layers and one fully-connected layer, each composite convolution layer includes a delay-domain convolution step and an angle-domain convolution step, and the delay-domain convolution step of the first composite convolution layer in the N composite convolution layers is smaller than the angle-domain convolution step of the first composite convolution layer in the N composite convolution layers, where N is a positive integer.

FIG. 2 is a schematic diagram of a first target CSI compression encoder, according to embodiments of the disclosure. As illustrated in FIG. 2, the first target CSI compression encoder includes N composite convolution layers and one fully-connected layer. Each of the N composite convolution layers in the implementation includes a convolution layer, a batch normalization layer, and an activation function layer.

It should be noted that the convolution layer in each composite convolution layer adopts a convolution kernel with a size of f×h×w×c and a convolution step of (g, p), where f represents a number of convolution kernels, h represents a height of the convolution kernel, w represents a width of the convolution kernel, c represents a number of input channels of the convolution kernel, g represents a delay-domain convolution step, and p represents an angle-domain convolution step. f is an adjustable parameter and may be adjusted according to usage requirements. f, h, w, c, g, and p are all positive integers.

Optionally, the convolution layer in the first composite convolution layer adopts a convolution kernel with a size of f×1×m×n and a convolution step of (k, l), where f corresponds a number of convolution kernels, 1 corresponds a height of the convolution kernel, m represents a width of the convolution kernel, n corresponds a number of input channels of the convolution kernel, k corresponds to a delay-domain convolution step, and l corresponds to an angle-domain convolution step. f is an adjustable parameter and may be adjusted according to usage requirements. f, m, n, k, and l are all positive integers.

Correlations of the target CSI matrix in the delay domain and the angle domain are different in the delay domain and in the angle domain, that is, the correlation in the angle domain is strong but the correlation in the delay domain is low. To compress and encode the target CSI matrix reasonably, in some embodiments, the first composite convolution layer in the first target CSI compression encoder needs to satisfy that the delay-domain convolution step k is smaller than the angle-domain convolution step l. Through the above condition, more compression may be performed on the angle-domain dimension with strong correlation and less compression may be performed on the delay-domain dimension with low correlation, so that the encoder has the better compression performance.

In embodiments of the disclosure, the first composite convolution layer also needs to satisfy the following conditions.

The delay-domain convolution step of the first composite convolution layer is smaller than a width of a convolution kernel in the first composite convolution layer. That is, the delay-domain convolution step k in the first composite convolution layer is less than the width m of the convolution kernel.

The angle-domain convolution step of the first composite convolution layer is smaller than a number of input channels of the convolution kernel in the first composite convolution layer. That is, the angle-domain convolution step l is smaller than the number n of input channels of the convolution kernel.

The UE performs a two-dimensional discrete Fourier transform (DFT) on a CSI matrix $H_f$ in a spatial-frequency domain to obtain the target CSI matrix in the delay domain and the angle domain. Furthermore, the target CSI matrix is input into the first target CSI compression encoder. The first target CSI compression encoder performs compression and encoding on the target CSI matrix to obtain the compressed encoded value. Optionally, a real part and/or an imaginary part of the target CSI matrix are input into the first composite convolution layer in the first target CSI compression encoder to obtain a tensor output by the first composite convolution layer. In some implementations, the real part or the imaginary part of the target CSI matrix is input into the first composite convolution layer respectively, or the real part and the imaginary part of the target CSI matrix are sequentially input into the first composite convolution layer.

Furthermore, a tensor output by a previous composite convolution layer is used as an input of a following composite convolution layer, until the $N^{th}$ composite convolution layer. Finally, a tensor output by the $N^{th}$ composite convolution layer is reconstructed, the reconstructed vector is input into the fully-connected layer, and the fully-connected layer performs the fully-connected operation to generate the compressed encoded value of the target CSI matrix. It should be noted that, under the action of the convolution step of the following composite convolution layer on the tensor output by the previous composite convolution layer, the size of the tensor output again through the convolution processing may change. Taking the first composite convolution layer as an example, if the size of the target CSI matrix is $1 \times N_{cc} \times N_t$, the size of the tensor output, after inputting the target CSI matrix into the first composite convolution layer and through convolution processing, is $f \times N_{cc}/k \times N_t/l$.

Optionally, in the scenario where the UE deploys only the first target CSI compression encoder, since the correlation of the real part of the CSI matrix and the correlation of the imaginary part of the CSI matrix are similar, the first target CSI compression encoder may be used to compress and encode the real part and the imaginary part of the target CSI matrix. In some implementations, the UE may extract the real part and the imaginary part of the target CSI matrix, and sequentially input the real part and the imaginary part of the target CSI matrix into the first target CSI compression encoder for encoding. That is, the UE serially inputs the real part and the imaginary part of the target CSI matrix into the first target CSI compression encoder for encoding. In the serial encoding mode, since only one target CSI compression encoder is deployed, the serial encoding mode takes up less resources.

Since the correlation of the real part of the CSI matrix and the correlation of the imaginary part of the CSI matrix are similar, parameters of the compression encoders used to encode the real part and the imaginary part are similar or the same. Therefore, optionally, based on model parameters of the first target CSI compression encoder, a second target CSI compression encoder is constructed, the real part and the imaginary part of the target CSI matrix are extracted, and the real part and the imaginary part of the target CSI matrix are respectively input into corresponding target CSI compression encoders for encoding. That is, the UE deploys two target CSI compression encoders at the same time, and may input the real part of the target CSI matrix into one of the target CSI compression encoders and input the imaginary part of the target CSI matrix into the other of the target CSI compression encoders in parallel. In the embodiments of the disclosure, since two target CSI compression encoders are deployed simultaneously in the parallel encoding mode, the real part and the imaginary part of the target CSI matrix may be encoded synchronously, so that the encoding speed of the parallel encoding mode is faster.

It should be understood that if the real part corresponds to the first target CSI compression encoder, the imaginary part corresponds to the second target CSI compression encoder, or if the real part corresponds to the second target CSI compression encoder, the imaginary part corresponds to the first target CSI compression encoder. Optionally, if real parts of sample CSI matrices are used to train the first target CSI compression encoder, correspondingly, the real part of the target CSI matrix corresponds to the first target CSI compression encoder, and the imaginary part of the target CSI matrix corresponds to the second target CSI compression encoder. If imaginary parts of sample CSI matrices are used to train the first target CSI compression encoder, correspondingly, the imaginary part of the target CSI matrix corresponds to the first target CSI compression encoder, and the real part of the target CSI matrix corresponds to the second target CSI compression encoder.

In the encoding method for CSI provided in the embodiments of the disclosure, the delay-domain convolution step of the first composite convolution layer in the first target CSI compression encoder deployed on the UE is smaller than the angle-domain convolution step of the first composite convolution layer. Because the correlation of the target CSI matrix in the angle domain is strong but the correlation of the target CSI matrix in the delay domain is low, the angle-domain dimension with strong correlation may be compressed more and the delay-domain dimension with low correlation may be compressed less through the first composite convolution layer, which not only improves the compression performance of the encoder, but also achieves the reasonable compression encoding for the target CSI matrix.

FIG. 3 is a schematic flowchart of another encoding method for CSI, according to embodiments of the disclosure. The encoding method for CSI is performed by the UE. As illustrated in FIG. 3, the encoding method for CSI includes the following steps.

S301, a first target CSI compression encoder is obtained by training a CSI compression encoder based on real parts or imaginary parts of sample CSI matrices in a delay domain and an angle domain.

In order to realize compression and encoding for CSI, it is necessary to pre-train the first target CSI compression encoder. At the beginning of the training, parameters of each layer are randomly initialized. In some embodiments of the disclosure, an initial CSI compression encoder is pre-constructed and the CSI compression encoder includes N composite convolution layers and one fully-connected layer. Each composite convolution layer includes a delay-domain convolution step and an angle-domain convolution step. The delay-domain convolution step of the first composite convolution layer in the N composite convolution layers is smaller than the angle-domain convolution step of the first composite convolution layer in the N composite convolution layers, where N is positive Integer.

Optionally, the first composite convolution layer also needs to satisfy the following conditions:

a delay-domain convolution step of the first composite convolution layer being smaller than a width of a convolution kernel in the first composite convolution layer;

an angle-domain convolution step of the first composite convolution layer being smaller than a number of input channels of the convolution kernels in the first composite convolution layer.

In some embodiments of the disclosure, the UE may collect sample CSI matrices in the delay domain and the angle domain. Optionally, the UE collects sample CSI matrices in the spatial-frequency domain and perform the two-dimensional DFT with the sample CSI matrices in the spatial-frequency domain to obtain the sample CSI matrices in the delay domain and the angle domain. Furthermore, the UE extracts real parts and imaginary parts from the obtained sample CSI matrices in the delay domain and the angle domain. Since the correlation of the real part of the CSI matrix and the correlation of the imaginary part of the CSI matrix are similar, the real parts or the imaginary parts of the sample CSI matrices in the delay domain and the angle domain are used to train the constructed CSI compression encoder until the training end condition is satisfied, and the first target CSI compression encoder is obtained. In the embodiments of the disclosure, only the real parts or the imaginary parts are used to train the CSI compression encoder and there is no need to use the real parts and the imaginary parts at the same time. Compared with the related art that the real parts and the imaginary parts of the CSI matrices are extracted respectively and the real parts and the imaginary parts are stacked as a whole for the input of the neural network model, the size of the input data is reduced, the amount of parameters and the amount of computation of the CSI compression encoder is also reduced, and the training speed is improved, in the disclosure.

The following example illustrates the process of constructing the sample CSI matrices in the delay domain and the angle domain.

The network device side uses the uniform linear array (ULA) mode for downlink transmission, where $N_t=32$ antennas are configured at half-wavelength intervals, while the UE is configured with a single antenna. By using $N_c=1024$ subcarriers and using a specified channel model such as COST 2100 MIMO channel model, 150,000 sample CSI matrices in the spatial-frequency domain are generated in a 5.3 GHz indoor picocell scenario, in which, 100,000 sample CSI matrices are used as a training set, 30,000 sample CSI matrices are used as a validation set, and 20,000 sample CSI matrices are used as a test set. The two-dimensional DFT is performed on sample CSI matrix $\tilde{H}$ in the spatial-frequency domain to obtain the sample CSI matrix $H_a$ in the delay domain and the angle domain, that is, $H_a=F_a \tilde{H} F_b^H$, where a size of $\tilde{H}$ is $N_c \times N_t$, $F_a$ represents a DFT matrix with a size of $N_c \times N_c$, $F_b$ represents a DFT matrix with a size of $N_t \times N_t$, and superscript H represents the conjugate transpose of the matrix.

It should be noted that after the DFT is performed on the sample CSI matrix $\tilde{H}$ in the spatial-frequency domain to obtain the sample CSI matrix $H_a$ in the delay domain and the angle domain, the obtained sample CSI matrix $H_a$ in the delay domain and the angle domain may have many rows with extremely small values or zero values. In order to reduce the amount of data processing, the non-zero principal value retention is performed on $H_a$ to obtain H. The size of H is $N_{cc} \times N_t$. The real part and the imaginary part of H are extracted respectively and denoted as $H_{re}$ and $H_{im}$, and the sizes of $H_{re}$ and $H_{im}$ both are $1 \times N_{cc} \times N_t$. In the up-sampling process, $H_a$ after the DFT processing only contains the first $N_{cc}=32$ non-zero rows, and the non-zero principal value retention is performed on $H_a$, that is, the first $N_{cc}=32$ non-zero rows are retained, and the matrix after the non-zero principal value retention is denoted as H.

For example, a CSI compression encoder may include 4 composite convolution layers and one fully-connected layer. Each composite convolution layer includes a convolution layer, a batch normalization layer, and an activation function layer. The convolution layer inside each composite convolution layer may include multiple or one convolution kernel, and the size of the convolution kernel(s) may be the same or different, which is not limited in some embodiments of the disclosure. For the introduction of the size of the convolution kernel, reference may be made to the description of the relevant content in any embodiment of the disclosure, and details are not repeated herein.

The convolution operation of each composite convolution layer is defined by a formula of:

$$y_{d,i,j} = \sum_c \sum_h \sum_w W_{d,c,h,w} x_{c,i \times s_1 + h, j \times s_2 + w} + b_d.$$

$y_{d,i,j}$ is the $(d, i, j)^{th}$ element in the convolution output y, $W_{d,c,h,w}$ is the $(d, c, h, w)^{th}$ element in the convolution kernel weight matrix W, $b_d$ is the $d^{th}$ element in the convolution kernel bias b, $c_{c,i*s_1+h,j*s_2+w}$ is the $(c, i \times s_1+h, j \times s_2+w)^{th}$ element in the convolution input x after zero padding, $s_1$ and $s_2$ are the convolution steps and denoted as $(s_1, s_2)$.

In some implementations, the activation function layer may use the LeakyReLU activation function, where the LeakyReLU activation function is defined by a formula of:

$$\text{Leaky } ReLU(x) = \begin{cases} x, & x \geq 0 \\ 0.3x, & x < 0 \end{cases}.$$

It should be noted that the activation function layer may also use other activation functions, which are not limited herein.

Optionally, the fully-connected operation is defined by a formula of:

$$y_i = \sum_j W_{i,j} x_i + b_i.$$

$y_i$ is the $i^{th}$ element in the fully-connected output, $W_{i,j}$ is the $(i, j)^{th}$ element in the fully-connected weight matrix, $b_i$ is the $i^{th}$ element in the fully-connected bias, $x_i$ is the $i^{th}$ element in the fully-connected input, and the fully-connected output $s_{re}$ and $s_{im}$ are one-dimensional tensors with a size of M. Let $N=N_{cc} \times N_r$ and the compression rate is defined as y=M/N, M<N and y<1 to achieve CSI compression.

In order to make the matrix size consistent, the input of each composite convolution layer may be treated with the same zero padding. In some implementations, $\lfloor(m-1)/2\rfloor$ and $\lceil(m-1)/2\rceil$ rows of 0 are added respectively on both sides of the second dimension $i*s_1+h$ of the convolution input, that is, the height dimension. $\lfloor(n-1)/2\rfloor$ and $\lceil(n-1)/2\rceil$ rows of 0 are added respectively on both sides of the third dimension $j \times s_2+w$ of the convolution input, that is, the width dimension. When the convolution input is $1 \times N_{cc} \times N_r$, the size of the second dimensional output after convolution is $\lfloor(N_{cc}-1)/s_1+1\rfloor$, and the size of the third dimensional output after convolution is $\lfloor(N_r-1)/s_2+1\rfloor$.

In some embodiments of the disclosure, before the real parts or the imaginary parts of the sample CSI matrices in the delay domain and the angle domain are input into the first composite convolution layer, they are first performed with the same zero-padding processing as described above and then input into the first composite convolution layer. Furthermore, the tensor output by the first composite convolution layer is performed with the same zero-padding processing and then input into the following composite convolution layer. The tensor(s) of the remaining composite convolution layer(s) may take the same zero-padding processing and be input into the following composite convolution layer until the $N^{th}$ composite convolution layer.

In some implementations, in order to make the trained first target CSI compression encoder better match the current UE, the UE may obtain an update CSI matrix in the delay domain and the angle domain. Based on the update CSI matrix, the first target CSI compression encoder is updated, that is, the first target CSI compression encoder is fine-tuned, so that the first target CSI compression encoder is more suitable for the current UE. Optionally, the first target CSI compression encoder is updated based on the real part or the imaginary part of the update CSI matrix. In some implementations, when the first target CSI compression encoder is trained based on the real parts of the sample CSI matrices, the real part of the update CSI matrix is used for updating. When the first target CSI compression encoder is trained based on the imaginary parts of the sample CSI matrices, the imaginary part of the update CSI matrix is used for updating. In other implementations, the correlation of the real part of the CSI matrix and the correlation of the imaginary part of the CSI matrix are similar. Therefore, when the first target CSI compression encoder is trained based on the real parts of the sample CSI matrices, the imaginary part of the update CSI matrix is used for updating, or when the first target CSI compression encoder is trained based on the imaginary parts of the sample CSI matrices, the real part of the update CSI matrix is used for updating.

It should be noted that the Adam optimization algorithm and the end-to-end learning manner are used to train the parameters of the first target CSI compression encoder to minimize the cost function. The cost function is described by a formula of:

$$L = \frac{1}{S} \sum_{i=1}^{S} \|\hat{H}_{re}[i] - H_{re}[i]\|.$$

S is the number of samples in the training set, $\|\cdot\|$ is the Euclidean norm, and the model parameters mainly include the weight and bias of the fully-connected layer, and the weight and bias of the convolution kernel.

After obtaining the first target CSI compression encoder, the UE may use the first target CSI compression encoder for encoding.

S302, a target CSI matrix in the delay domain and the angle domain, is encoded based on the first target CSI compression encoder to generate a compressed encoded value.

Regarding the implementation of step S302, any implementation manner in the embodiments of the disclosure may be adopted, and details are not described herein again.

It should be noted that, in the parallel encoding mode, if the first target CSI compression encoder is an encoder trained based on the real parts of the sample CSI matrices, the real part of the target CSI matrix is input into the first target CSI compression encoder for encoding and the imaginary part of the target CSI matrix is input into the second target CSI compression encoder for encoding. If the first target CSI compression encoder is an encoder trained based on the imaginary parts of the sample CSI matrices, the imaginary part of the target CSI matrix is input into the first target CSI compression encoder for encoding and the real part of the target CSI matrix is input into the first target CSI compression encoder for encoding.

In the encoding method for CSI provided in the embodiments of the disclosure, the CSI compression encoding model is trained by using the real parts or the imaginary parts of the sample CSI matrices in the delay domain and the angle domain, without using the real parts and the imaginary parts at the same time, which reduces the size of the input data, reduces the amount of parameters and the amount of computation of the CSI compression encoder, and improves the training speed. Furthermore, the delay-domain convolution step of the first composite convolution layer in the first target CSI compression encoder deployed on the UE is smaller than the angle-domain convolution step of the first composite convolution layer. The correlation of the target CSI matrix in the angle domain is strong and the correlation of the target CSI matrix in the delay domain is low. Therefore, through the first composite convolution layer, more compression may be performed on the angle-domain dimension with strong correlation and less compression may be performed on the delay-domain dimension with low correlation, which improves the compression performance of the encoder and realizes the reasonable compression encoding of the target CSI matrix.

Figure 4:
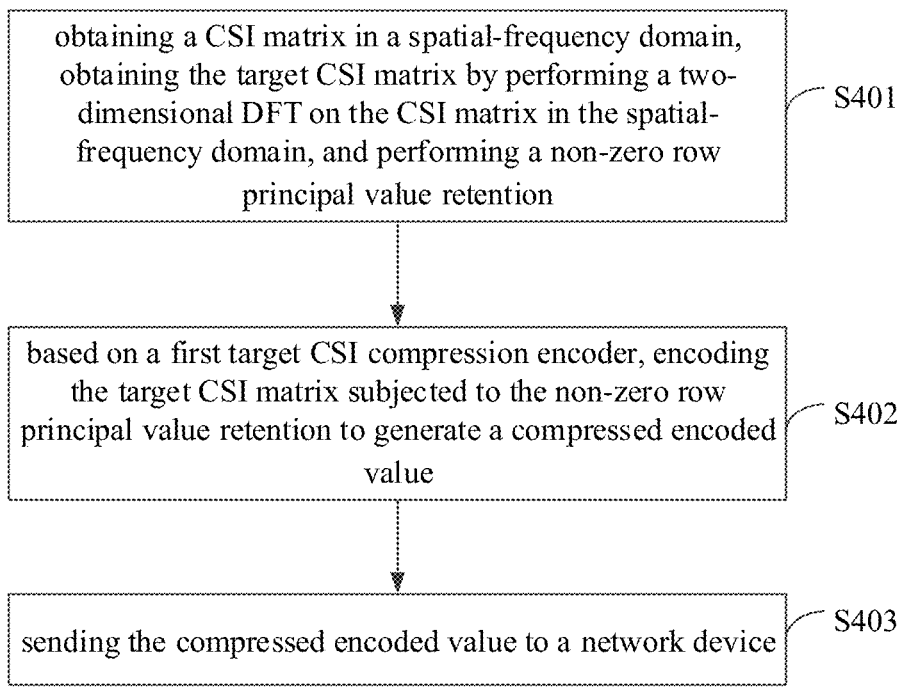
FIG. 4 is a schematic flowchart of another encoding method for CSI, according to embodiments of the disclosure.

FIG. 4 is a schematic flowchart of another encoding method for CSI, according to embodiments of the disclosure. The encoding method for CSI is performed by the UE. As illustrated in FIG. 4, the encoding method for CSI includes the following steps.

S401, a CSI matrix in a spatial-frequency domain is obtained, the target CSI matrix is obtained by performing a two-dimensional DFT on the CSI matrix in the spatial-frequency domain, and a non-zero row principal value retention is performed.

The implementation of step S401 may adopt any implementation manner in each embodiment of the disclosure, which will not be repeated herein.

S402, based on a first target CSI compression encoder, the target CSI matrix subjected to the non-zero row principal value retention is encoded to generate a compressed encoded value.

The real part and the imaginary part are extracted from the target CSI, and the real part and the imaginary part are compressed and encoded respectively based on the first target CSI compression encoder. Optionally, the real part and the imaginary part may be compressed and encoded in a serial encoding manner or a parallel encoding manner. For the specific introduction of the serial encoding mode and the parallel encoding mode, reference may be made to the description of the relevant content in each embodiment of the disclosure, which will not be repeated herein.

S403, the compressed encoded value is sent to a network device.

In the embodiments of the disclosure, the low-latitude matrix $s_{re}$ is obtained after the real part of the target CSI matrix is compressed and encoded; and the low-latitude matrix $S_{im}$ is obtained after the imaginary part of the target CSI matrix is compressed and encoded. There is a feedback link between the UE and the network device, and the UE sends the obtained low-latitude matrices $s_{re}$ and $s_{im}$ to the network device through the feedback link.

In the encoding method for CSI provided in the embodiments of the disclosure, the delay-domain convolution step of the first composite convolution layer in the first target CSI compression encoder deployed on the UE is smaller than the angle-domain convolution step of the first composite convolution layer. The correlation of the target CSI matrix in the angle domain is strong but the correlation of the target CSI matrix in the delay domain is low. Therefore, through the first composite convolution layer, the angle-domain dimension with strong correlation may be compressed more and the delay-domain dimension with low correlation may be compressed less, which not only improves the compression performance of the encoder, but also achieves the reasonable compression encoding for the target CSI matrix.

Figure 5:
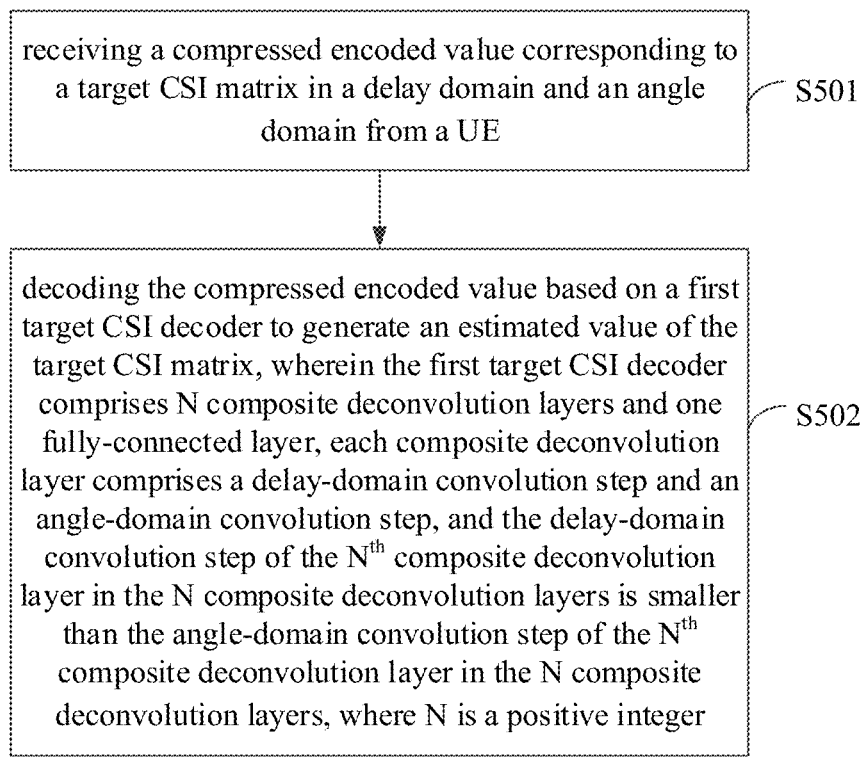
FIG. 5 is a schematic flowchart of a decoding method for CSI, according to embodiments of the disclosure.

FIG. 5 is a schematic flowchart of a decoding method for CSI, according to embodiments of the disclosure. The decoding method for CSI is performed by a network device. As illustrated in FIG. 5, the decoding method for CSI includes the following steps.

S501, a compressed encoded value corresponding to a target CSI matrix in a delay domain and an angle domain is received from a UE.

In the embodiments of the disclosure, the UE performs compression and encoding processing on the real part and the imaginary part of the target CSI matrix in the delay domain and the angle domain based on the first target CSI compression encoder, and obtains the compressed encoded value corresponding to the target CSI matrix. After the real part of the target CSI matrix is compressed and encoded, the low-latitude matrix $s_{re}$ is obtained, which is the compressed encoded value corresponding to the real part of the target CSI matrix. After the imaginary part of the target CSI matrix is compressed and encoded, the low-latitude matrix $s_{im}$ is obtained, which is the compressed encoded value corresponding to the imaginary part of the target CSI matrix. For the process that the UE compresses and encodes the real part and the imaginary part of the target CSI matrix in the delay domain and the angle domain based on the first target CSI compression encoder, reference may be made to the description of the relevant content in the above embodiments, and details are not repeated herein.

There is a feedback link between the UE and the network device. The UE sends the low-latitude matrices $s_{re}$ and $s_{im}$ to the network device through the feedback link. Correspondingly, the network device receives the low-latitude matrices $s_{re}$ and $s_{im}$ fed back by the UE through the feedback link.

S502, the compressed encoded value is decoded based on a first target CSI decoder to generate an estimated value of the target CSI matrix, in which the first target CSI decoder includes N composite deconvolution layers and one fully-connected layer, each composite deconvolution layer includes a delay-domain convolution step and an angle-domain convolution step, and the delay-domain convolution step of the $N^{th}$ composite deconvolution layer in the N composite deconvolution layers is smaller than the angle-domain convolution step of the $N^{th}$ composite deconvolution layer in the N composite deconvolution layers, where N is a positive integer.

Figure 6:
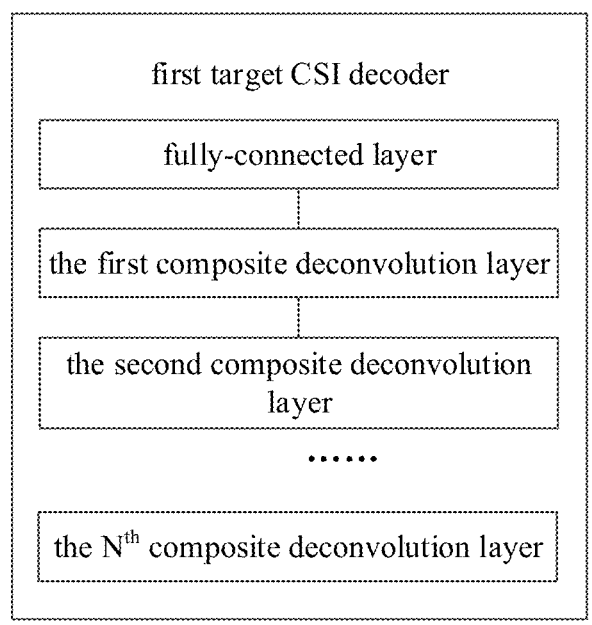
FIG. 6 is a schematic diagram of a first target CSI decoder, according to embodiments of the disclosure.

FIG. 6 is a schematic diagram of a first target CSI decoder, according to embodiments of the disclosure. As illustrated in FIG. 6, the first target CSI decoder includes one fully-connected layer and N composite deconvolution layers. Each of the N composite deconvolution layers in the implementation includes a deconvolution layer, a batch normalization layer, and an activation function layer.

It should be noted that the deconvolution layer in each composite deconvolution layer adopts a deconvolution kernel with a size of f×h×w×c and a convolution step of (g, p), where f represents a number of deconvolution kernels, h represents a height of the deconvolution kernel, w represents a width of the deconvolution kernel, c represents a number of input channels of the deconvolution kernel, g represents a delay-domain convolution step, and p represents an angle-domain convolution step. f is an adjustable parameter and may be adjusted according to usage requirements. f, h, w, c, g, and p are all positive integers.

Optionally, the deconvolution layer in the $N^{th}$ composite deconvolution layer adopts a deconvolution kernel with a size of f×1×m×n and a convolution step of (k, l), where f corresponds a number of deconvolution kernels, 1 corresponds a height of the deconvolution kernel, m represents a width of the deconvolution kernel, n corresponds a number of input channels of the deconvolution kernel, k corresponds to a delay-domain convolution step, and l corresponds to an angle-domain convolution step. f is an adjustable parameter and may be adjusted according to usage requirements. f, m, n, k, and l are all positive integers.

In the example of the disclosure, the CSI compression encoder deployed in the UE defines that the first composite deconvolution layer needs to satisfy that the delay-domain convolution step k is smaller than the angle-domain convolution step l. Correspondingly, in order to accurately decode the target CSI matrix, the $N^{th}$ composite deconvolution layer in the first target CSI decoder needs to satisfy that the delay-domain convolution step k is smaller than the angle-domain convolution step l.

In some embodiments of the disclosure, the $N^{th}$ composite deconvolution layer also needs to satisfy the following conditions.

The delay-domain convolution step of the $N^{th}$ composite deconvolution layer is smaller than a width of a convolution kernel of the $N^{th}$ composite deconvolution layer, that is, the delay-domain convolution step k in the $N^{th}$ composite deconvolution layer is smaller than the width m of the deconvolution kernel.

The angle-domain convolution step of the $N^{th}$ composite deconvolution layer is smaller than a number of input channels of the convolution kernel in the $N^{th}$ composite deconvolution layer, that is, the angle-domain convolution step l in the $N^{th}$ composite deconvolution layer is smaller than the number n of input channels of the deconvolution kernel.

The network device is deployed with the first target CSI decoder, and the received compressed encoded value is input into the first target CSI decoder for decoding to obtain the estimated value of the target CSI matrix. That is, the network device inputs the low-latitude matrix $s_{re}$ corresponding to the real part of the target CSI matrix and/or the low-latitude matrix corresponding to the imaginary part of the target CSI matrix into the first target CSI decoder for decoding to obtain the estimated real part and the estimated imaginary part of the CSI matrix in the delay domain and the angle domain, that is, $\hat{H}_{re}$ and $\hat{H}_{im}$.

Optionally, the network device inputs the low-latitude matrix $s_{re}$ corresponding to the real part and/or the low-latitude matrix corresponding to the imaginary part into the fully-connected layer in the first target CSI decoder, and the fully-connected layer outputs a vector. The vector is reconstructed to generate the first tensor. In some implementations, the low-latitude matrix $s_{re}$ corresponding to the real part of the target CSI matrix or the low-latitude matrix corresponding to the imaginary part of the target CSI matrix is respectively input into the fully-connected layer, or the low-latitude matrix $s_{re}$ corresponding to the real part of the target CSI matrix and the low-latitude matrix $s_{im}$ corresponding to the imaginary part of the target CSI matrix are sequentially input to the fully-connected layer.

After the first tensor is obtained, the first tensor is input into the first composite deconvolution layer to obtain the second tensor. Furthermore, the tensor output by the previous composite deconvolution layer is used as the input of the following composite deconvolution layer until the $N^{th}$ composite deconvolution layer, in which the output tensor of the $N^{th}$ composite deconvolution layer is the estimated value of the target CSI matrix. It should be noted that, under the action of the convolution step of the following composite deconvolution layer on the tensor output by the previous composite deconvolution layer, the size of the tensor output again through the convolution processing may change. $s_{re}$ and $s_{im}$ are input into the fully-connected layer to output a vector of $1 \times (N_{cc} \times (N_f/2))$, and the first tensor with a size of $1 \times N_{cc} \times (N_f/2)$ is reconstructed. Taking the first composite deconvolution layer as an example, the size of the first tensor is $1 \times N_{cc} \times (N_f/2)$, which is input into the second composite deconvolution layer and becomes a tensor with a size of f $\times N_{cc} \times (N_f/2)$ after deconvolution processing.

Optionally, in the scenario where the network device only deploys the first target CSI decoder, since the correlation of the real part of the CSI matrix and the correlation of the imaginary part of the CSI matrix are similar, the first target CSI decoder may be used to decode the compressed encoded value of the real part of the target CSI matrix and the compressed encoded value of the imaginary part of the target CSI matrix. In some implementations, the network device sequentially inputs the compressed encoded value of the real part of the target CSI matrix and the compressed encoded value of the imaginary part of the target CSI matrix into the first target CSI decoder for decoding. That is, the network device serially inputs the real part and the imaginary part of the target CSI matrix into the first target CSI decoder for decoding. In the serial decoding mode, since only one target CSI decoder is deployed, the serial encoding mode takes up less resources.

Since the correlation of the real part of the CSI matrix and the correlation of the imaginary part of the CSI matrix are similar, parameters of the decoder used for decoding the real part and the imaginary part are similar or the same. Therefore, optionally, based on model parameters of the first target CSI decoder, a second target CSI decoder is constructed, and the compressed encoded value of the real part of the target CSI matrix and the compressed encoded value of the imaginary part of the target CSI matrix are input respectively into respective corresponding target CSI decoders for decoding. That is, the network device deploys two target CSI decoders at the same time, and input the compressed encoded value of the real part of the target CSI matrix into one of the target CSI decoders and the compressed encoded value of the imaginary part of the target CSI matrix into the other of the target CSI decoders in parallel. In some embodiments of the disclosure, since two target CSI decoders are deployed at the same time in the parallel decoding mode, the real part and the imaginary part of the target CSI matrix may be decoded synchronously, so that the decoding speed of the parallel decoding mode is faster.

It should be understood that, if the compressed encoded value of the real part corresponds to the first target CSI decoder, the compressed encoded value of the imaginary part corresponds to the second target CSI decoder, or if the compressed encoded value of the real part corresponds to the second target CSI decoder, the compressed encoded value of the imaginary part corresponds to the first target CSI decoder. Optionally, if the compressed encoded values of the real parts of the sample CSI matrices are used to train the first target CSI decoder, correspondingly, the compressed encoded value of the real part of the target CSI matrix corresponds to the first target CSI decoder and the compressed encoded value of the imaginary part of the target CSI matrix corresponds to the second target CSI decoder. If the compressed encoded values of the imaginary parts of the sample CSI matrices are used to train the first target CSI decoder, correspondingly, the compressed encoded value of the imaginary part of the target CSI matrix corresponds to the first target CSI decoder and the compressed encoded value of the real part of the target CSI matrix corresponds to the second target CSI decoder.

In the decoding method for CSI provided in embodiments of the disclosure, the delay-domain convolution step of the first composite convolution layer in the first target CSI compression encoder deployed on the UE is smaller than the angle-domain convolution step of the first composite convolution layer. The correlation of the CSI matrix in the angle domain is strong but the correlation of the CSI matrix in the delay domain is low. The first composite convolution layer may compress the angle-domain dimension with strong correlation more and compress the delay-domain dimension with low correlation less. Accordingly, the delay-domain convolution step of the $N^{th}$ composite deconvolution layer in the first target CSI decoder deployed on the network device is smaller than the angle-domain convolution step of the $N^{th}$ composite deconvolution layer, so the $N^{th}$ composite deconvolution layer may restore more angle-domain dimension with strong correlation and restore less delay-domain dimension with low correlation, thereby realizing the accurate decoding of the compressed encoded value of the target CSI matrix.

Figure 7:
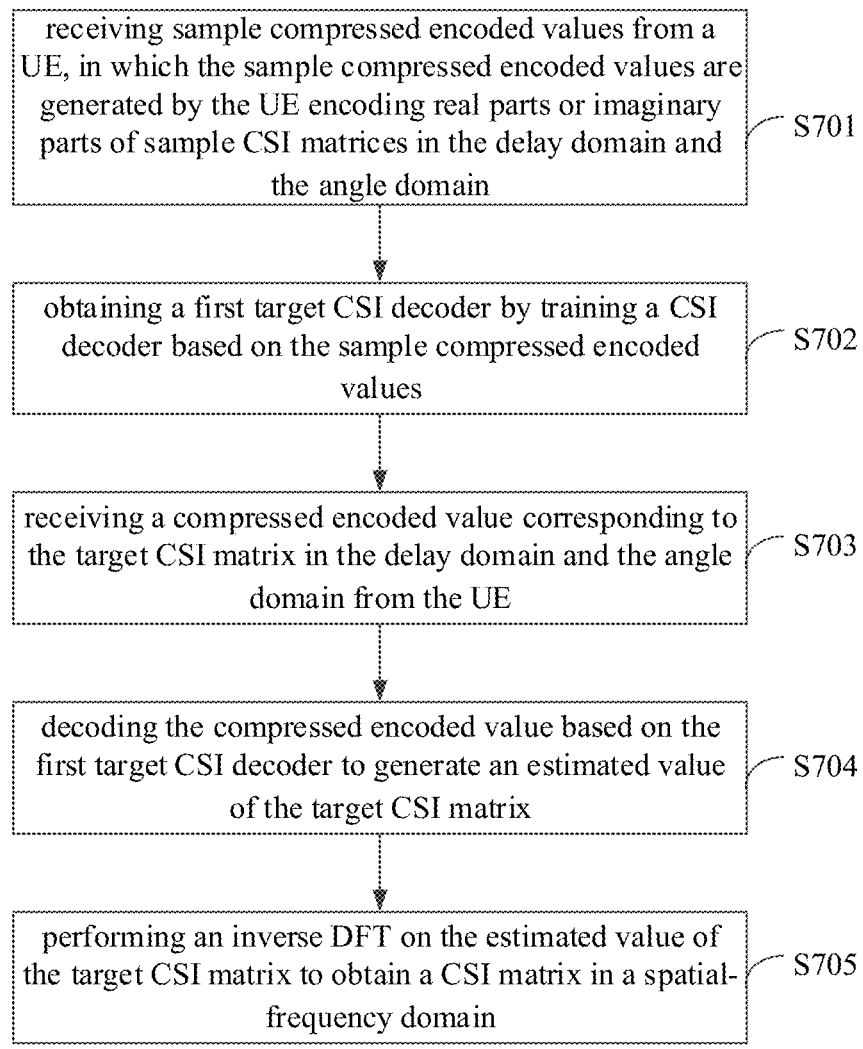
FIG. 7 is a schematic flowchart of another decoding method for CSI, according to embodiments of the disclosure.

FIG. 7 is a schematic flowchart of another decoding method for CSI, according to embodiments of the disclosure. The decoding method for CSI is performed by the network device. As illustrated in FIG. 7, the decoding method for CSI includes the following steps.

S701, sample compressed encoded values are received from a UE, in which the sample compressed encoded values are generated by the UE encoding real parts or imaginary parts of sample CSI matrices in the delay domain and the angle domain.

The UE uses the CSI compression encoder to encode real parts or imaginary parts of sample CSI matrices in the delay domain and the angle domain to generate sample compressed encoded values corresponding to the real parts or sample compressed encoded values corresponding to the imaginary parts. For the specific introduction of the CSI compression encoder, reference may be made to the description of the related content in the above embodiments, and details are not repeated herein. For the process that the UE compresses and encodes the real parts or the imaginary parts of the sample CSI matrices in the delay domain and the angle domain based on the CSI compression encoder, reference may be made to the description of the relevant content in the above embodiments, and details are not repeated herein.

S702, a first target CSI decoder is obtained by training a CSI decoder based on the sample compressed encoded values.

In order to realize the decoding of the CSI matrix encoding, it is necessary to pre-train the first target CSI decoder, and at the beginning of the training, parameters of each layer are randomly initialized. In some embodiments of the disclosure, an initial CSI decoder is pre-constructed, and the CSI decoder includes one fully-connected layer and N composite deconvolution layers, in which each composite deconvolution layer includes a delay-domain convolution step and the angle-domain convolution step, the delay-domain convolution step of the $N^{th}$ composite deconvolution layer in the N composite deconvolution layers is smaller than the angle-domain convolution step of the $N^{th}$ composite deconvolution layer, where N is a positive integer.

Optionally, the $N^{th}$ composite deconvolution layer also needs to satisfy the following conditions:
the delay-domain convolution step of the $N^{th}$ composite deconvolution layer being smaller than a width of a convolution kernel of the $N^{th}$ composite deconvolution layer; and
the angle-domain convolution step of the $N^{th}$ composite deconvolution layer being smaller than a number of input channels of the convolution kernel in the $N^{th}$ composite deconvolution layer.

In some embodiments of the disclosure, the correlation of the real part of the CSI matrix and the correlation of the imaginary part of the CSI matrix are similar. Therefore, the compressed encoded values of the real parts of the sample CSI matrix in the delay domain and the angle domain or the compressed encoded values of the imaginary parts of the sample CSI matrix in the delay domain and the angle domain are used to train the encoder until the training end condition is satisfied and the first target CSI decoder is obtained. Optionally, the training end condition may be that the difference between the output $\hat{H}_{re}$ of the CSI decoder of the network device and $H_{re}$ is the smallest or the number of training times reaches a preset number of times.

In some embodiments of the disclosure, only the compressed encoded values of the real parts or the compressed encoded values of the imaginary parts are used to train the CSI decoder, and there is no need to use the compressed encoded values of the real parts and the compressed encoded values of the imaginary parts at the same time. Compared with the related art that the compressed encoded values of the real parts and the compressed encoded values of the imaginary parts are respectively taken out and stacked as a whole for the input of the neural network model, the size of the input data is reduced, and the amount of parameters and the amount of computation of the CSI decoder is also reduced, and the training speed is improved, in the disclosure.

For example, a CSI decoder may include one fully-connected layer and 4 composite deconvolution layers. Each composite deconvolution layer includes a deconvolution layer, a batch normalization layer, and an activation function layer. The deconvolution layer in each composite deconvolution layer may include multiple or one deconvolution kernel, and the size of the deconvolution kernel(s) may be the same or different, which is not limited in some embodiments of the disclosure. For the introduction of the size of the deconvolution kernel, reference may be made to the description of the relevant content in any embodiment of the disclosure, and details are not repeated herein.

The convolution operation of each composite deconvolution layer is defined by a formula of:

$$y^D_{d,i,j} = \sum_c \sum_h \sum_w W^D_{d,c,h,w} x^D_{c,i+h,j+w} + b^D_d.$$

$y_{d,i,j}{}^D$ is the $(d, i, j)^{th}$ element in the deconvolution output $y^D$, $W_{d,c,h,w}{}^D$ is the $(d, c, h, w)^{th}$ element in the deconvolution kernel weight matrix $W^D$, $b_d^D$ is the $d^{th}$ element in the deconvolution kernel bias $b^D$, $x_{c,i+h,j+w}^D$ is the $(c, i+h, j+w)^{th}$ element in the deconvolution input $x^D$ after the deconvolution input $x^D$ is performed with zero-padding preprocessing and zero-padding, and $s_1^D$ and $s_2^D$ are the deconvolution steps and denoted as $(s_1^D, s_2^D)$. The superscript D only indicates that it is related to deconvolution.

In some implementations, the first N−1 composite deconvolution layers of the N composite deconvolution layers use the LeakyReLU activation function, and the $N^{th}$ composite deconvolution layer uses the logistic function as the activation function. It should be noted that the activation function layer may also adopt other activation functions, which are not limited herein.

In order to make the matrix size consistent, the input of each composite deconvolution layer may be treated with the same zero padding. In some implementations, $(s_1^D-1)$ zeros are inserted between each element of the second dimension i+h (that is, the height dimension) of the deconvolution input, and $(s_2^D-1)$ zeros are inserted between each element of the third dimension j+w (that is, the width dimension) of the deconvolution input. After the deconvolution input is preprocessed with zero-padding, the number of zero-padding is the same as the convolution zero-padding with a convolution step of (1, 1).

In some embodiments of the disclosure, before the output vector of the fully-connected layer is reconstructed and then input into the first composite deconvolution layer, the same zero-padding process described above is first performed on it and then it may be input into the first composite deconvolution layer. The tensor output by the first composite deconvolution layer is performed with the same zero-padding, and then input into the following composite deconvolution layer. The tensor output by each of the remaining composite deconvolution layers is performed with the same zero-padding before being input into the following composite deconvolution layer until the $N^{th}$ composite deconvolution layer.

In some implementations, in order to make the trained first target CSI decoder better match the current network device, the network device may receive the update compressed encoded value of the update CSI matrix in the delay domain and the angle domain through a feedback link, and updates the first target CSI decoder based on the update compressed encoded value, that is, the first target CSI decoder is fine-tuned, so that the first target CSI decoder is more suitable for the current network device.

Optionally, the network device updates the first target CSI decoder based on the update compressed encoded value corresponding to the real part of the update CSI matrix or the update compressed encoded value corresponding to the imaginary part of the update CSI matrix. When the first target CSI decoder is trained based on the sample compressed encoded values of the real parts of the sample CSI matrices, it is updated using the update compressed encoded value of the real part of the update CSI matrix. When the first target CSI decoder is trained based on sample compressed encoded values of the imaginary parts of the sample CSI matrices, it is updated using the update compressed encoded value of the imaginary part of the CSI matrix. In other implementations, since the correlation of the real part of the CSI matrix and the correlation of the imaginary part of the CSI matrix are similar, when the first target CSI decoder is trained based on the sample compressed encoded values of the real parts of the sample CSI matrices, it is updated using the update compressed encoded value of the imaginary part of the CSI matrix, and when the first target CSI decoder is trained based on sample compressed encoded values of the imaginary parts of the sample CSI matrices, it is updated using the update compressed encoded value of the real part of the CSI matrix.

It should be noted that the Adam optimization algorithm and the end-to-end learning manner are used to train the parameters of the first target CSI decoder to minimize the cost function. The cost function is described by a formula of:

$$L = \frac{1}{S}\sum_{i=1}^{S}\left\|\hat{H}_{re}[i] - H_{re}[i]\right\|.$$

S is the number of samples in the training set, $\|\cdot\|$ is the Euclidean norm, and the model parameters mainly include the weight and bias of the fully-connected layer, and the weight and bias of the deconvolution kernel.

After obtaining the first target CSI decoder, the network device may use the first target CSI decoder for decoding.

S703, a compressed encoded value corresponding to the target CSI matrix in the delay domain and the angle domain is received from the UE.

S704, the compressed encoded value is decoded based on the first target CSI decoder to generate an estimated value of the target CSI matrix.

The implementation of steps S703 to S704 may adopt any implementation manner in the embodiments of the disclosure, which will not be repeated herein.

Optionally, the decoding method for CSI provided in some embodiments of the disclosure may further include:

S705, an inverse DFT is performed on the estimated value of the target CSI matrix to obtain a CSI matrix in a spatial-frequency domain.

The network device combines the estimated value fire of the real part of the target CSI matrix and the estimated value $\hat{H}_{im}$ of the imaginary part of the target CSI matrix, output by the target CSI decoder, into a complex matrix $\hat{H}$. The complex matrix $\hat{H}$ is performed with the two-dimensional inverse DFT to obtain the reconstructed value H f of the original CSI matrix in the spatial-frequency domain.

In the decoding method for CSI provided in the embodiment of the disclosure, the delay-domain convolution step of the first composite convolution layer in the first target CSI compression encoder deployed on the UE is smaller than the angle-domain convolution step of the first composite convolution layer. The correlation of the CSI matrix in the angle domain is strong but the correlation of the CSI matrix in the delay domain is low. The first composite convolution layer may compress the angle-domain dimension with strong correlation more and compress the delay-domain dimension with low correlation less. Accordingly, the delay-domain convolution step of the $N^{th}$ composite deconvolution layer in the first target CSI decoder deployed on the network device is smaller than the angle-domain convolution step of the $N^{th}$ composite deconvolution layer, so the $N^{th}$ composite deconvolution layer may restore more angle-domain dimension with strong correlation and restore less delay-domain dimension with low correlation, thereby realizing the accurate decoding of the compressed encoded value of the target CSI matrix.

It should be noted that the dimension number f of the convolution kernel(s) and the deconvolution kernel(s) in the above-mentioned embodiments may be selected according to the actual application requirements. If the feedback accuracy is high and the number of parameters is low, f=32 may be selected; and if the number of parameters is as small as possible and the feedback accuracy may be appropriately reduced, f=16 may be selected.

Figure 8:
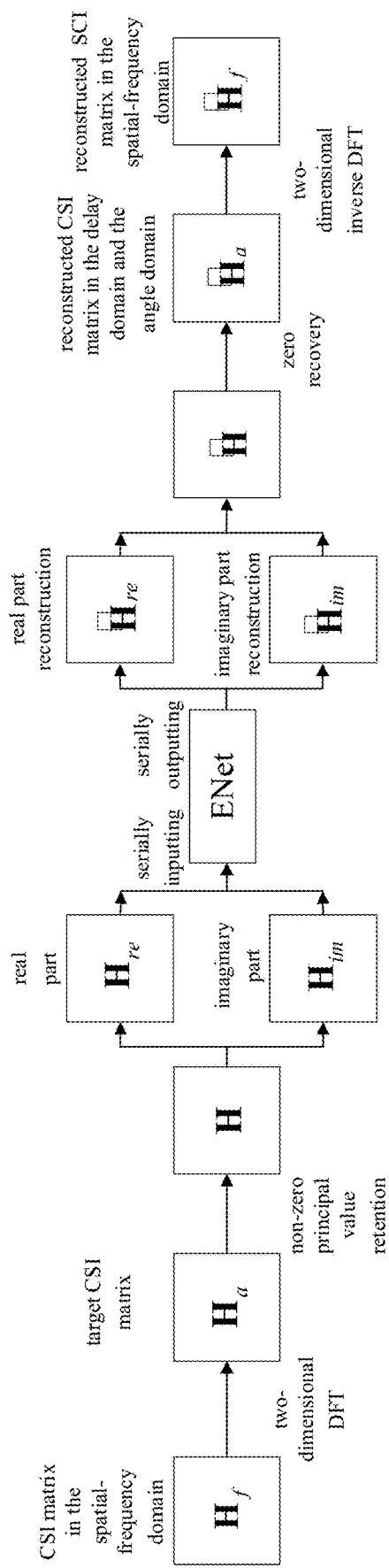
FIG. 8 is a schematic flowchart of a CSI transmission method, according to embodiments of the disclosure.

FIG. 8 is a schematic flowchart of a CSI transmission method, according to embodiments of the disclosure. As illustrated in FIG. 8, the UE compresses and encodes for the target CSI matrix in a serial encoding manner, and the network device decodes for the target CSI matrix in a serial decoding manner. The ENet model includes a first target CSI compression encoder and a first target CSI decoder.

The UE performs two-dimensional DFT processing on the CSI matrix $H_f$ in the spatial-frequency domain to obtain the target CSI matrix $H_a$ in the delay domain and the angle domain, and performs the non-zero principal value retention on $H_a$ to obtain H and takes out the real part and the imaginary part of H respectively to denote as $H_{re}$ and $H_{im}$.

Furthermore, the UE serially inputs $H_{re}$ and $H_{im}$ into the ENet model, and the first target CSI compression encoder of the ENet model sequentially encodes $H_{re}$ and $H_{im}$ serially to generate a compressed encoded value $s_{re}$ of $H_{re}$ and a compressed encoded value $s_{im}$ of $H_{im}$.

The UE sends $s_{re}$ and $s_{im}$ to the network device through the feedback link. The first target CSI decoder of the ENet model sequentially decodes $s_{re}$ and $s_{im}$ serially and reconstructs to generate the estimated value $\hat{H}_{re}$ of $s_{re}$ and the estimated value $\hat{H}_{im}$ of $H_{im}$. The estimated value $\hat{H}_{re}$ of $s_{re}$ and the estimated value $\hat{H}_{im}$ of $H_{im}$ are combined into a complex matrix $\hat{H}$. The zero recovery is performed on $\hat{H}$ to generate a reconstructed matrix $\hat{H}_a$ in the delay domain and the angle domain. Furthermore, the reconstructed matrix $\hat{H}_a$ is performed with the two-dimensional inverse DFT processing to obtain the reconstructed value of the original CSI matrix in the spatial-frequency domain.

Figure 9:
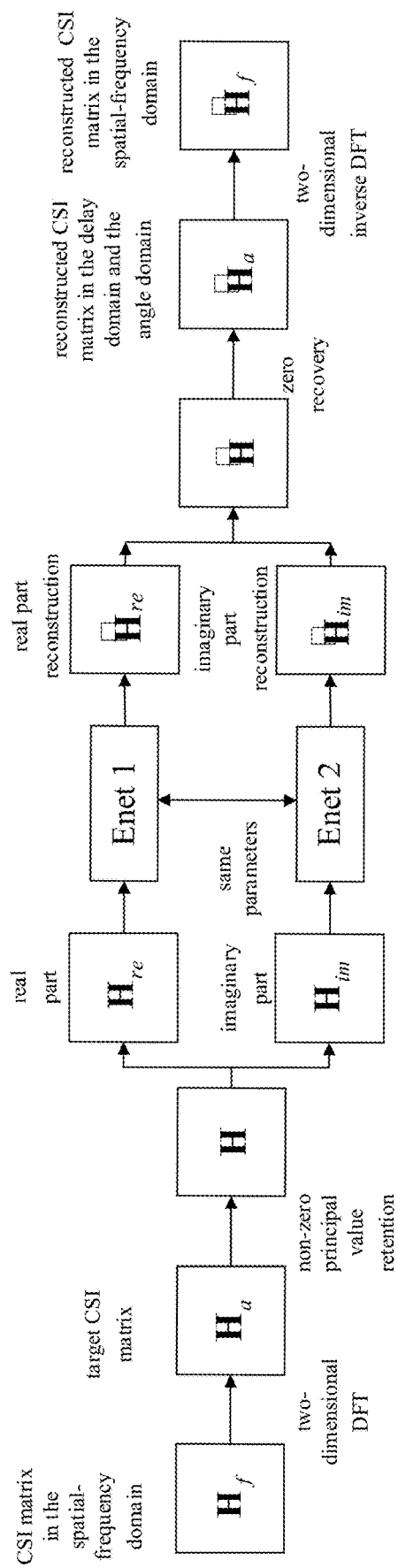
FIG. 9 is a schematic flowchart of another CSI transmission method, according to embodiments of the disclosure.

FIG. 9 is a schematic flowchart of another CSI transmission method, according to embodiments of the disclosure. As illustrated in FIG. 9, the UE compresses and encodes for the target CSI matrix in a parallel encoding manner, and the network device decodes for the target CSI matrix in a parallel decoding manner. The ENet model 1 includes a first target CSI compression encoder and a first target CSI decoder. The ENet model 2 includes a second target CSI compression encoder and a second target CSI decoder. Parameters of the first target CSI compression encoder and parameters of the second target CSI compression encoder are the same. Parameters of the first target CSI decoder and parameters of the second target CSI decoder are the same.

The UE performs two-dimensional DFT processing on the CSI matrix $H_f$ in the spatial-frequency domain to obtain the target CSI matrix $H_a$ in the delay domain and the angle domain, and performs the non-zero principal value retention on $H_a$ to obtain H and takes out the real part and the imaginary part of H respectively to denote as $H_{re}$ and $H_{im}$.

Furthermore, the UE inputs $H_{re}$ into ENet model 1 and inputs $H_{im}$ into ENet model 2 in parallel. The first target CSI compression encoder in the ENet model 1 encodes $H_{re}$ and the second target CSI compression encoder in the ENet model 2 encodes $H_{im}$ in parallel to generate a compressed encoded value $s_{re}$ of $H_{re}$ and a compressed encoded value $s_{im}$ of $H_{im}$.

The UE sends $s_{re}$ and $s_{im}$ to the network device through the feedback link in parallel. The first target CSI decoder of the ENet model 1 decodes $s_{re}$ and reconstructs to generate the estimated value $\hat{H}_{re}$ of $s_{re}$ and the second target CSI decoder of the ENet model 2 decodes $s_{im}$ and reconstructs to generate the estimated value $\hat{H}_{im}$ of $H_{im}$ in parallel. Furthermore, the estimated value $\hat{H}_{re}$ of $s_{re}$ and the estimated value $\hat{H}_{im}$ of $H_{im}$ are combined into a complex matrix $\hat{H}$. The zero recovery is performed on $\hat{H}$ to generate a reconstructed matrix $\hat{H}_a$ in the delay domain and the angle domain. Furthermore, the reconstructed matrix $\hat{H}_a$ is performed with the two-dimensional inverse DFT processing to obtain the reconstructed value of the original CSI matrix in the spatial-frequency domain.

Figure 10:
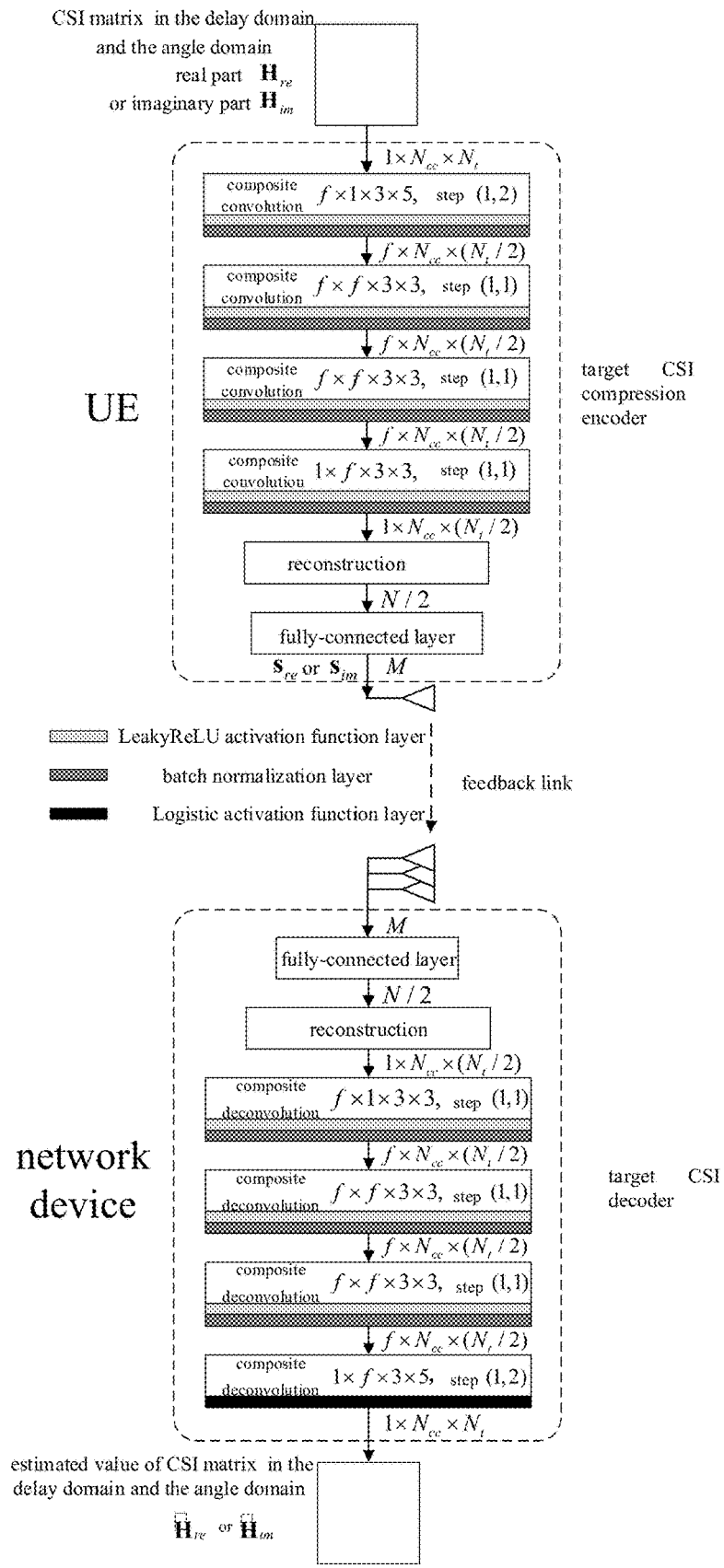
FIG. 10 is a schematic flowchart of another CSI transmission method, according to embodiments of the disclosure.

FIG. 10 is a schematic flowchart of a CSI transmission method, according to embodiments of the disclosure. As illustrated in FIG. 10, the UE is deployed with a target CSI compression encoder and the network device is deployed with a target CSI decoder. The target CSI compression encoder includes 4 composite convolution layers and one fully-connected layer. The target CSI decoder includes one fully-connected layer and 4 composite deconvolution layers.

For example, the convolution layer of the first composite convolution layer in the target CSI compression encoder adopts a convolution kernel with a size of f×1×3×5 and a convolution step of (1, 2), that is, m=3, k=5, k=1, l=2. The convolution layer of the second composite convolution layer and the convolution layer of the third composite convolution layer both adopt a convolution kernel with a size of f×f×3×3 and a convolution step of (1, 1). The convolution layer of the fourth composite convolution layer adopts a convolution kernel with a size of 1×f×3×3 and a convolution step of (1, 1). The UE extracts the real part $H_{re}$ and the imaginary part $H_{im}$ from the CSI matrix H in the delay domain and the angle domain and inputs $H_{re}$ and/or $H_{im}$ into the CSI compression encoder. The sizes of $H_{re}$ and $H_{im}$ are both 1×$N_{cc}$×$N_t$. After the convolution layer of the first composite convolution layer of the CSI compression encoder performs convolution processing on $H_{re}$ or $H_{im}$, a tensor with a size of f×$N_{cc}$×($N_t$/2) is output. The tensor with the size of f×$N_{cc}$×($N_t$/2) is input into the second composite convolution layer. After convolution processing by the convolution layer of the second composite convolution layer, a tensor with a size of f×$N_{cc}$×($N_t$/2) is output. The tensor with the size of f×$N_{cc}$×($N_t$/2) output by the second composite convolution layer is input into the third composite convolution layer. After convolution processing by the convolution layer of the third composite convolution layer, a tensor with a size of f×$N_{cc}$×($N_t$/2) is output. The tensor with the size of f×$N_{cc}$×($N_t$/2) output by the third convolution layer is input into the fourth composite convolution layer. After convolution processing by the convolution layer of the fourth composite convolution layer, a tensor with a size of 1×$N_{cc}$×($N_t$/2) is output. The output tensor is reconstructed into a vector of 1×(1×$N_{cc}$×($N_t$/2)) that is input to the fully-connected layer for the fully-connected operation, to output $s_{re}$ or $s_{im}$. $s_{re}$ or $s_{im}$ is a one-dimensional tensor with a size of M.

The UE sends $s_{re}$ or $s_{im}$ to the network device through the feedback link. The network device inputs $s_{re}$ or $s_{im}$ into the CSI decoder.

The deconvolution layer of the first composite deconvolution layer in the CSI decoder adopts a deconvolution kernel with a size of f×1×3×3. The convolution layer of the second composite deconvolution layer and the convolution layer of the third deconvolution layer both adopt a deconvolution kernel with a size of f×f×3×3 and a deconvolution step of (1,1). The deconvolution layer of the fourth deconvolution layer adopts a deconvolution kernel with a size of f×1×3×5 and a deconvolution step of (1,2). The network device inputs $s_{re}$ or $s_{im}$ into the fully-connected layer for the fully-connected processing to output a vector of 1×($N_{cc}$×($N_t$/2)) for reconstructing to output a tensor with a size of 1×$N_{cc}$×($N_t$/2) as the input of the first composite deconvolution layer. After the deconvolution layer of the first composite deconvolution layer performs the deconvolution processing on the tensor with the size of 1×$N_{cc}$×($N_t$/2) to output a tensor with a size of f×$N_{cc}$×($N_t$/2). The tensor with the size of f×$N_{cc}$×($N_t$/2) output by the first composite deconvolution layer is input into the second composite deconvolution layer. After the deconvolution processing of the convolution layer of the second composite deconvolution layer, a tensor with a size of f×$N_{cc}$×($N_t$/2) is output. The tensor with the size of f×$N_{cc}$×($N_t$/2) output by the second composite deconvolution layer is input into the third composite deconvolution layer. After the deconvolution processing of the convolution layer of the third composite deconvolution layer, a tensor with a size of f×$N_{cc}$×($N_t$/2) is output. The tensor with the size of f×$N_{cc}$×($N_t$/2) output by the third composite deconvolution layer is input into the fourth composite deconvolution layer. After the deconvolution processing of the convolution layer of the fourth composite deconvolution layer, a tensor with a size of 1×$N_{cc}$×$N_t$ is output, that is, the estimated value $\hat{H}_{re}$ of the real part or the estimated value $\hat{H}_{im}$ of the imaginary part of the original CSI matrix in the delay domain and the angle domain.

Optionally, the network device combines the estimated value $\hat{H}_{re}$ of the real part or the estimated value $\hat{H}_{im}$ of the imaginary part, output by the CSI decoder, into a complex matrix $\hat{H}$, and a two-dimensional inverse DFT is performed on $\hat{H}$ to obtain the reconstructed value $\hat{H}_f$ of the original CSI matrix in the spatial-frequency domain.

Corresponding to the encoding methods for CSI provided in the above-mentioned embodiments, the disclosure further provides encoding apparatuses for CSI. The implementations of the encoding methods for CSI are also applicable to the encoding apparatuses provided in some embodiments, which are be described in detail.

Figure 11:
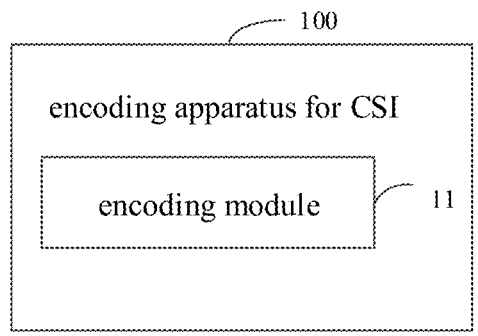
FIG. 11 is a block diagram of an encoding apparatus for CSI, according to embodiments of the disclosure.

FIG. 11 is a block diagram of an encoding apparatus for CSI, according to embodiments of the disclosure. As illustrated in FIG. 11, the encoding apparatus 100 for CSI includes an encoding module 11.

The encoding module 11 is configured to encode, based on a first target CSI compression encoder, a target CSI matrix in a delay domain and an angle domain, to generate a compressed encoded value, in which the first target CSI compression encoder includes N composite convolution layers and one fully-connected layer, each composite convolution layer includes a delay-domain convolution step and an angle-domain convolution step, and the delay-domain convolution step of the first composite convolution layer in the N composite convolution layers is smaller than the angle-domain convolution step of the first composite convolution layer in the N composite convolution layers, where N is a positive integer.

The first target CSI compression encoder includes N composite convolution layers and one fully-connected layer. Each of the N composite convolution layers in the implementation includes a convolution layer, a batch normalization layer, and an activation function layer.

Correlations of the target CSI matrix in the delay domain and the angle domain are different in the delay domain and in the angle domain, that is, the correlation in the angle domain is strong but the correlation in the delay domain is low. To compress and encode the target CSI matrix reasonably, in some embodiments, the first composite convolution layer in the first target CSI compression encoder needs to satisfy that the delay-domain convolution step k is smaller than the angle-domain convolution step l. Through the above condition, more compression may be performed on the angle-domain dimension with strong correlation and less compression may be performed on the delay-domain dimension with low correlation, so that the encoder has the better compression performance.

In embodiments of the disclosure, the first composite convolution layer also needs to satisfy the following conditions.

The delay-domain convolution step of the first composite convolution layer is smaller than a width of a convolution kernel in the first composite convolution layer. That is, the delay-domain convolution step k in the first composite convolution layer is less than the width m of the convolution kernel.

The angle-domain convolution step of the first composite convolution layer is smaller than a number of input channels of the convolution kernel in the first composite convolution layer. That is, the angle-domain convolution step l is smaller than the number n of input channels of the convolution kernel.

The UE performs a two-dimensional discrete Fourier transform (DFT) on a CSI matrix $H_f$ in a spatial-frequency domain to obtain the target CSI matrix in the delay domain and the angle domain. Furthermore, the target CSI matrix is input into the first target CSI compression encoder. The first target CSI compression encoder performs compression and encoding on the target CSI matrix to obtain the compressed encoded value. Optionally, a real part and/or an imaginary part of the target CSI matrix are input into the first composite convolution layer in the first target CSI compression encoder to obtain a tensor output by the first composite convolution layer. In some implementations, the real part or the imaginary part of the target CSI matrix is input into the first composite convolution layer respectively, or the real part and the imaginary part of the target CSI matrix are sequentially input into the first composite convolution layer.

Furthermore, a tensor output by a previous composite convolution layer is used as an input of a following composite convolution layer, until the $N^{th}$ composite convolution layer. Finally, a tensor output by the $N^{th}$ composite convolution layer is reconstructed, the reconstructed vector is input into the fully-connected layer, and the fully-connected layer performs the fully-connected operation to generate the compressed encoded value of the target CSI matrix.

Optionally, in the scenario where the UE deploys only the first target CSI compression encoder, since the correlation of the real part of the CSI matrix and the correlation of the imaginary part of the CSI matrix are similar, the first target CSI compression encoder may be used to compress and encode the real part and the imaginary part of the target CSI matrix. In some implementations, the UE may extract the real part and the imaginary part of the target CSI matrix, and sequentially input the real part and the imaginary part of the target CSI matrix into the first target CSI compression encoder for encoding. That is, the UE serially inputs the real part and the imaginary part of the target CSI matrix into the first target CSI compression encoder for encoding. In the serial encoding mode, since only one target CSI compression encoder is deployed, the serial encoding mode takes up less resources.

Since the correlation of the real part of the CSI matrix and the correlation of the imaginary part of the CSI matrix are similar, parameters of the compression encoders used to encode the real part and the imaginary part are often similar or the same. Therefore, optionally, based on model parameters of the first target CSI compression encoder, a second target CSI compression encoder is constructed, the real part and the imaginary part of the target CSI matrix are extracted, and the real part and the imaginary part of the target CSI matrix are respectively input into corresponding target CSI compression encoders for encoding. That is, the UE deploys two target CSI compression encoders at the same time, and may input the real part of the target CSI matrix into one of the target CSI compression encoders and input the imaginary part of the target CSI matrix into the other of the target CSI compression encoders in parallel. In the embodiments of the disclosure, since two target CSI compression encoders are deployed simultaneously in the parallel encoding mode, the real part and the imaginary part of the target CSI matrix may be encoded synchronously, so that the encoding speed of the parallel encoding mode is faster.

It should be understood that if the real part corresponds to the first target CSI compression encoder, the imaginary part corresponds to the second target CSI compression encoder, or if the real part corresponds to the second target CSI compression encoder, the imaginary part corresponds to the first target CSI compression encoder. Optionally, if real parts of sample CSI matrices are used to train the first target CSI compression encoder, correspondingly, the real part of the target CSI matrix corresponds to the first target CSI compression encoder, and the imaginary part of the target CSI matrix corresponds to the second target CSI compression encoder. If imaginary parts of sample CSI matrices are used to train the first target CSI compression encoder, correspondingly, the imaginary part of the target CSI matrix corresponds to the first target CSI compression encoder, and the real part of the target CSI matrix corresponds to the second target CSI compression encoder.

In the encoding apparatus for CSI provided in the embodiments of the disclosure, the delay-domain convolution step of the first composite convolution layer in the first target CSI compression encoder deployed on the UE is smaller than the angle-domain convolution step of the first composite convolution layer. Because the correlation of the target CSI matrix in the angle domain is strong but the correlation of the target CSI matrix in the delay domain is low, the angle-domain dimension with strong correlation may be compressed more and the delay-domain dimension with low correlation may be compressed less through the first composite convolution layer, which not only improves the compression performance of the encoder, but also achieves the reasonable compression encoding for the target CSI matrix.

Figure 12:
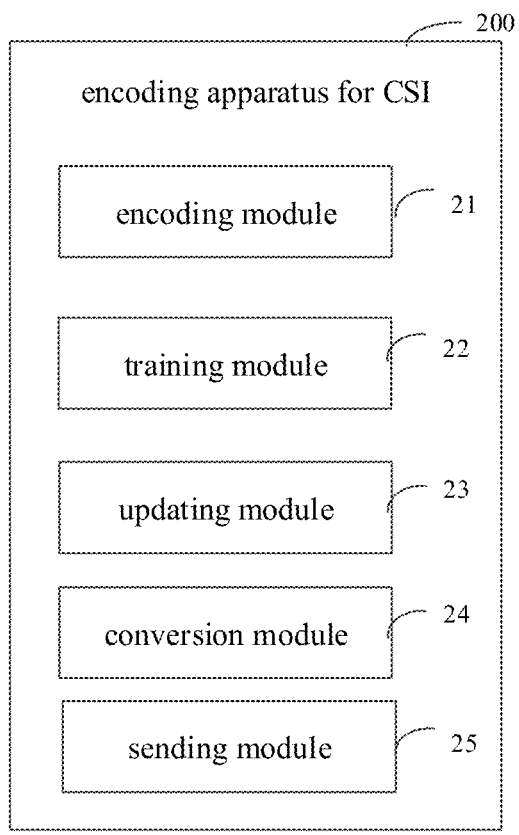
FIG. 12 is a block diagram of another encoding apparatus for CSI, according to embodiments of the disclosure.

FIG. 12 is a block diagram of another encoding apparatus for CSI, according to embodiments of the disclosure. As illustrated in FIG. 12, the encoding apparatus 200 for CSI includes an encoding module 21, a training module 22, an updating module 23, a conversion module 24, and a sending module 25.

The encoding module 21 is configured to encode, based on a first target CSI compression encoder, a target CSI matrix in a delay domain and an angle domain, to generate a compressed encoded value, in which the first target CSI compression encoder includes N composite convolution layers and one fully-connected layer, each composite convolution layer includes a delay-domain convolution step and an angle-domain convolution step, and the delay-domain convolution step of the first composite convolution layer in the N composite convolution layers is smaller than the angle-domain convolution step of the first composite convolution layer in the N composite convolution layers, where N is a positive integer.

The training module 22 is configured to obtain the first target CSI compression encoder by training a CSI compression encoder based on real parts or imaginary parts of sample CSI matrices in the delay domain and the angle domain.

The update module 23 is configured to obtain an update CSI matrix in the delay domain and the angle domain, and update the first target CSI compression encoder based on the update CSI matrix.

Optionally, the encoding module 21 is further configured to:
construct a second target CSI compression encoder based on model parameters of the first target CSI compression encoder;
extract a real part and an imaginary part of the target CSI matrix; and
input respectively the real part and the imaginary part of the target CSI matrix into respective corresponding target CSI compression encoders for encoding.

Optionally, the encoding module 21 is further configured to:
in response to the first target CSI compression encoder being an encoder trained based on the real parts of the sample CSI matrices, input the real part of the target CSI matrix into the first target CSI compression encoder for encoding and input the imaginary part of the target CSI matrix into the second target CSI compression encoder for encoding; or
in response to the first target CSI compression encoder being an encoder trained based on the imaginary parts of the sample CSI matrices, input the imaginary part of the target CSI matrix into the first target CSI compression encoder for encoding and input the real part of the target CSI matrix into the second target CSI compression encoder for encoding.

Optionally, the encoding module 21 is further configured to:
extract a real part and an imaginary part of the target CSI matrix and input sequentially the real part and the imaginary part into the first target CSI compression encoder for encoding.

Optionally, an encoding process performed by the first target CSI compression encoder includes:
inputting a real part and/or an imaginary part of the target CSI matrix into the first composite convolution layer to obtain a tensor output by the first composite convolution layer;
using a tensor output by a previous composite convolution layer as an input of a following composite convolution layer until the $N^{th}$ composite convolution layer; and
reconstructing a tensor output by the $N^{th}$ composite convolution layer to obtain a reconstructed vector, and inputting the reconstructed vector into the fully-connected layer to generate the compressed encoded value.

Optionally, each of the N composite convolution layers includes a convolution layer, a batch normalization layer, and an activation function layer.

Optionally, the encoding module 21 is further configured to perform a same zero-padding on an input of each composite convolution layer.

Optionally, the conversion module 24 is configured to obtain a CSI matrix in a spatial-frequency domain, obtain the target CSI matrix by performing a two-dimensional DFT on the CSI matrix in the spatial-frequency domain, and performing a non-zero row principal value retention.

Optionally, the sending module 25 is configured to send the compressed encoder value to a network device.

In the encoding apparatus for CSI provided in some embodiments of the disclosure, the CSI compression encoding model is trained by using the real parts or the imaginary parts of the sample CSI matrices in the delay domain and the angle domain, without using the real parts and the imaginary parts at the same time, which reduces the size of the input data, reduces the amount of parameters and the amount of computation of the CSI compression encoder, and improves the training speed. Furthermore, the delay-domain convolution step of the first composite convolution layer in the first target CSI compression encoder deployed on the UE is smaller than the angle-domain convolution step of the first composite convolution layer. The correlation of the target CSI matrix in the angle domain is strong and the correlation of the target CSI matrix in the delay domain is low. Therefore, through the first composite convolution layer, more compression may be performed on the angle-domain dimension with strong correlation and less compression may be performed on the delay-domain dimension with low correlation, which improves the compression performance of the encoder and realizes the reasonable compression encoding of the target CSI matrix.

Corresponding to the decoding methods for CSI provided in the above-mentioned embodiments, the disclosure further provides decoding apparatuses for CSI. The implementations of the decoding methods for CSI are also applicable to the decoding apparatuses for CSI provided in some embodiments, which are be described in detail.

Figure 13:
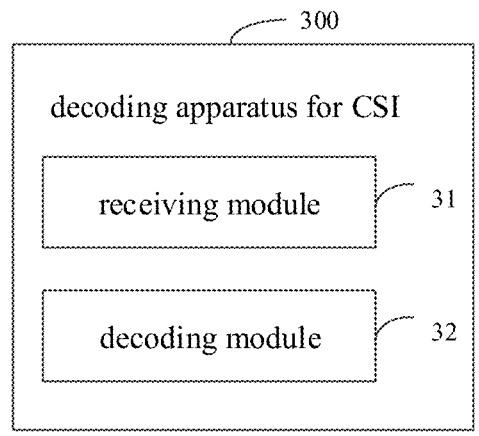
FIG. 13 is a block diagram of a decoding apparatus for CSI, according to embodiments of the disclosure.

FIG. 13 is a block diagram of a decoding apparatus for CSI, according to embodiments of the disclosure. As illustrated in FIG. 13, the decoding apparatus 300 for CSI includes a receiving module 31 and a decoding module 32.

The receiving module 31 is configured to receive a compressed encoded value corresponding to a target CSI matrix in a delay domain and an angle domain from a UE.

The decoding module 32 is configured to decode the compressed encoded value based on a first target CSI decoder to generate an estimated value of the target CSI matrix, in which the first target CSI decoder includes N composite deconvolution layers and one fully-connected layer, each composite deconvolution layer includes a delay-domain convolution step and an angle-domain convolution step, and the delay-domain convolution step of the $N^{th}$ composite deconvolution layer in the N composite deconvolution layers is smaller than the angle-domain convolution step of the $N^{th}$ composite deconvolution layer in the N composite deconvolution layers, where N is a positive integer.

In the embodiments of the disclosure, the UE performs compression and encoding processing on the real part and the imaginary part of the target CSI matrix in the delay domain and the angle domain based on the first target CSI compression encoder, and obtains the compressed encoded value corresponding to the target CSI matrix. After the real part of the target CSI matrix is compressed and encoded, the low-latitude matrix $s_{re}$ is obtained, which is the compressed encoded value corresponding to the real part of the target CSI matrix. After the imaginary part of the target CSI matrix is compressed and encoded, the low-latitude matrix $s_{im}$ is obtained, which is the compressed encoded value corresponding to the imaginary part of the target CSI matrix. For the process that the UE compresses and encodes the real part and the imaginary part of the target CSI matrix in the delay domain and the angle domain based on the first target CSI compression encoder, reference may be made to the description of the relevant content in the above embodiments, and details are not repeated herein.

There is a feedback link between the UE and the network device. The UE sends the low-latitude matrices $s_{re}$ and $s_{im}$ to the network device through the feedback link. Correspondingly, the network device receives the low-latitude matrices $s_{re}$ and $s_{im}$ fed back by the UE through the feedback link.

The first target CSI decoder includes one fully-connected layer and N composite deconvolution layers. Each of the N composite deconvolution layers in the implementation includes a deconvolution layer, a batch normalization layer, and an activation function layer.

In the example of the disclosure, the CSI compression encoder deployed in the UE defines that the first composite deconvolution layer needs to satisfy that the delay-domain convolution step k is smaller than the angle-domain convolution step l. Correspondingly, in order to accurately decode the target CSI matrix, the $N^{th}$ composite deconvolution layer in the first target CSI decoder needs to satisfy that the delay-domain convolution step k is smaller than the angle-domain convolution step l.

In some embodiments of the disclosure, the $N^{th}$ composite deconvolution layer also needs to satisfy the following conditions.

The delay-domain convolution step of the $N^{th}$ composite deconvolution layer is smaller than a width of a convolution kernel of the $N^{th}$ composite deconvolution layer, that is, the delay-domain convolution step k in the $N^{th}$ composite deconvolution layer is smaller than the width m of the deconvolution kernel.

The angle-domain convolution step of the $N^{th}$ composite deconvolution layer is smaller than a number of input channels of the convolution kernel in the $N^{th}$ composite deconvolution layer, that is, the angle-domain convolution step l in the $N^{th}$ composite deconvolution layer is smaller than the number n of input channels of the deconvolution kernel.

The network device is deployed with the first target CSI decoder, and the received compressed encoded value is input into the first target CSI decoder for decoding to obtain the estimated value of the target CSI matrix. That is, the network device inputs the low-latitude matrix $s_{re}$ corresponding to the real part of the target CSI matrix and/or the low-latitude matrix $s_{im}$ corresponding to the imaginary part of the target CSI matrix into the first target CSI decoder for decoding to obtain the estimated real part and the estimated imaginary part of the CSI matrix in the delay domain and the angle domain, that is, $\hat{H}_{re}$ and $\hat{H}_{im}$.

Optionally, the network device inputs the low-latitude matrix $s_{re}$ corresponding to the real part and/or the low-latitude matrix $s_{im}$ corresponding to the imaginary part into the fully-connected layer in the first target CSI decoder, and the fully-connected layer outputs a vector. The vector is reconstructed to generate the first tensor. In some implementations, the low-latitude matrix $s_{re}$ corresponding to the real part of the target CSI matrix or the low-latitude matrix $s_{im}$ corresponding to the imaginary part of the target CSI matrix is respectively input into the fully-connected layer, or the low-latitude matrix $s_{re}$ corresponding to the real part of the target CSI matrix and the low-latitude matrix $s_{im}$ corresponding to the imaginary part of the target CSI matrix are sequentially input to the fully-connected layer.

After the first tensor is obtained, the first tensor is input into the first composite deconvolution layer to obtain the second tensor. Furthermore, the tensor output by the previous composite deconvolution layer is used as the input of the following composite deconvolution layer until the $N^{th}$ composite deconvolution layer, in which the output tensor of the $N^{th}$ composite deconvolution layer is the estimated value of the target CSI matrix. It should be noted that, under the action of the convolution step of the following composite deconvolution layer on the tensor output by the previous composite deconvolution layer, the size of the tensor output again through the convolution processing may change.

Optionally, in the scenario where the network device only deploys the first target CSI decoder, since the correlation of the real part of the CSI matrix and the correlation of the imaginary part of the CSI matrix are similar, the first target CSI decoder may be used to decode the compressed encoded value of the real part of the target CSI matrix and the compressed encoded value of the imaginary part of the target CSI matrix. In some implementations, the network device sequentially inputs the compressed encoded value of the real part of the target CSI matrix and the compressed encoded value of the imaginary part of the target CSI matrix into the first target CSI decoder for decoding. That is, the network device serially inputs the real part and the imaginary part of the target CSI matrix into the first target CSI decoder for decoding. In the serial decoding mode, since only one target CSI decoder is deployed, the serial encoding mode takes up less resources.

Since the correlation of the real part of the CSI matrix and the correlation of the imaginary part of the CSI matrix are similar, parameters of the decoder used for decoding the real part and the imaginary part are often similar or the same. Therefore, optionally, based on model parameters of the first target CSI decoder, a second target CSI decoder is constructed, and the compressed encoded value of the real part of the target CSI matrix and the compressed encoded value of the imaginary part of the target CSI matrix are input respectively into respective corresponding target CSI decoders for decoding. That is, the network device deploys two target CSI decoders at the same time, and input the compressed encoded value of the real part of the target CSI matrix into one of the target CSI decoders, and the compressed encoded value of the imaginary part of the target CSI matrix into the other of the target CSI decoders in parallel. In some embodiments of the disclosure, since two target CSI decoders are deployed at the same time in the parallel decoding mode, the real part and the imaginary part of the target CSI matrix may be decoded synchronously, so that the decoding speed of the parallel decoding mode is faster.

It should be understood that, if the compressed encoded value of the real part corresponds to the first target CSI decoder, the compressed encoded value of the imaginary part corresponds to the second target CSI decoder, or if the compressed encoded value of the real part corresponds to the second target CSI decoder, the compressed encoded value of the imaginary part corresponds to the first target CSI decoder. Optionally, if the compressed encoded values of the real parts of the sample CSI matrices are used to train the first target CSI decoder, correspondingly, the compressed encoded value of the real part of the target CSI matrix corresponds to the first target CSI decoder, and the compressed encoded value of the imaginary part of the target CSI matrix corresponds to the second target CSI decoder. If the compressed encoded values of the imaginary parts of the sample CSI matrices are used to train the first target CSI decoder, correspondingly, the compressed encoded value of the imaginary part of the target CSI matrix corresponds to the first target CSI decoder, and the compressed encoded value of the real part of the target CSI matrix corresponds to the second target CSI decoder.

In the decoding apparatus for CSI provided in embodiments of the disclosure, the delay-domain convolution step of the first composite convolution layer in the first target CSI compression encoder deployed on the UE is smaller than the angle-domain convolution step of the first composite convolution layer. The correlation of the CSI matrix in the angle domain is strong but the correlation of the CSI matrix in the delay domain is low. The first composite convolution layer may compress the angle-domain dimension with strong correlation more and compress the delay-domain dimension with low correlation less. Accordingly, the delay-domain convolution step of the $N^{th}$ composite deconvolution layer in the first target CSI decoder deployed on the network device is smaller than the angle-domain convolution step of the $N^{th}$ composite deconvolution layer, so the $N^{th}$ composite deconvolution layer may restore more angle-domain dimension with strong correlation and restore less delay-domain dimension with low correlation, thereby realizing the accurate decoding of the compressed encoded value of the target CSI matrix.

Figure 14:
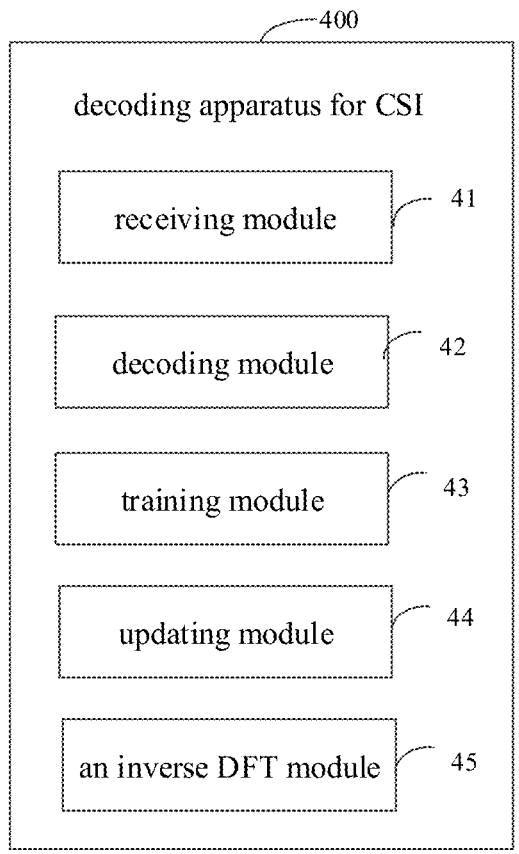
FIG. 14 is a block diagram of another decoding apparatus for CSI, according to embodiments of the disclosure.

FIG. 14 is a block diagram of another decoding apparatus for CSI, according to embodiments of the disclosure. As illustrated in FIG. 14, the decoding apparatus 400 for CSI includes a receiving module 41, a decoding module 42, a training module 43, an updating module 44, and an inverse DFT module 45.

The receiving module 41 is configured to receive a compressed encoded value corresponding to a target CSI matrix in a delay domain and an angle domain from a UE.

The decoding module 42 is configured to decode the compressed encoded value based on a first target CSI decoder to generate an estimated value of the target CSI matrix, in which the first target CSI decoder includes N composite deconvolution layers and one fully-connected layer, each composite deconvolution layer includes a delay-domain convolution step and an angle-domain convolution step, and the delay-domain convolution step of the $N^{th}$ composite deconvolution layer in the N composite deconvolution layers is smaller than the angle-domain convolution step of the $N^{th}$ composite deconvolution layer in the N composite deconvolution layers, where N is a positive integer.

Optionally, the receiving module 41 is further configured to receive sample compressed encoded values from the UE, in which the sample compressed encoded values are generated by the UE encoding real parts or imaginary parts of sample CSI matrices in the delay domain and the angle domain.

Optionally, the training module 43 is configured to obtain the first target CSI decoder by training a CSI decoder based on the sample compressed encoded values.

Optionally, the $N^{th}$ composite deconvolution layer satisfies the following conditions:
- the delay-domain convolution step of the $N^{th}$ composite deconvolution layer being smaller than a width of a convolution kernel of the $N^{th}$ composite deconvolution layer; and
- the angle-domain convolution step of the $N^{th}$ composite deconvolution layer being smaller than a number of input channels of the convolution kernel in the $N^{th}$ composite deconvolution layer.

Optionally, the updating module 44 is configured to receive an update compressed encoded value of an update CSI matrix in the delay domain and the angle domain from the UE, and update the first target CSI decoder based on the update compressed encoded value.

Optionally, the compressed encoded value includes a first compressed encoded value of a real part of the target CSI matrix and a second compressed encoded value of an imaginary part of the target CSI matrix, and the decoding module 42 is further configured to:
construct a second target CSI decoder based on model parameters of the first target CSI decoder; and input respectively the first compressed encoded value and the second compressed encoded value into respective corresponding target CSI decoders for decoding.

Optionally, the decoding module 42 is further configured to:
- in response to the first target CSI decoder being a decoder trained based on the real parts of the sample CSI matrices, input the first compressed encoded value into the first target CSI decoder for decoding and input the second compressed encoded value into the second target CSI decoder for decoding; or
- in response to the first target CSI decoder being a decoder trained based on the imaginary parts of the sample CSI matrices, input the first compressed encoded value into the second target CSI decoder for decoding and input the second compressed encoded value into the first target CSI decoder for decoding.

Optionally, the compressed encoded value includes a first compressed encoded value of a real part of the target CSI matrix and a second compressed encoded value of an imaginary part of the target CSI matrix, and the decoding module 42 is further configured to: input sequentially the first compressed encoded value and the second compressed encoded value into the first target CSI decoder for decoding.

Optionally, a decoding process performed by the first target CSI decoder includes:
- inputting the compressed encoded value into the fully-connected layer to output a vector and reconstructing the vector to generate a first tensor;
- inputting the first tensor to the first composite deconvolution layer to obtain a second tensor; and
- using a tensor output by a previous composite deconvolution layer as an input of a following composite deconvolution layer until the $N^{th}$ composite deconvolution layer, in which an output of the $N^{th}$ composite deconvolution layer is the estimated value of the target CSI matrix.

Optionally, each of the N composite deconvolution layers includes a deconvolution layer, a batch normalization layer, and an activation function layer.

Optionally, the decoding module 42 is further configured to perform a same zero-padding on an input of each composite deconvolution layer.

Optionally, the inverse DFT module 45 is configured to perform an inverse DFT on the estimated value of the target CSI matrix to obtain a CSI matrix in a spatial-frequency domain.

In the decoding apparatus for CSI provided in embodiments of the disclosure, the delay-domain convolution step of the $N^{th}$ composite deconvolution layer in the first target CSI decoder deployed on the network device is smaller than the angle-domain convolution step, so the $N^{th}$ composite deconvolution layer may restore more angle-domain dimension with strong correlation and restore less delay-domain dimension with low correlation, thereby realizing the accurate decoding of the compressed encoded value of the target CSI matrix.

According to embodiments of the disclosure, the disclosure further provides a communication device and a readable storage medium.

Figure 15:
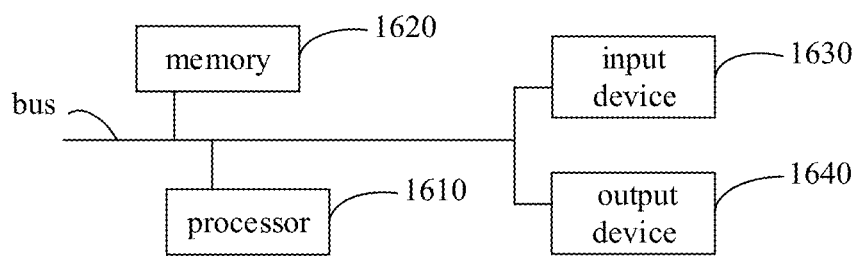
FIG. 15 is a block diagram of a communication device, according to embodiments of the disclosure.

As illustrated in FIG. 15, the communication device includes: one or more processors 1610, a memory 1620, and interfaces for connecting various components, including a high-speed interface and a low-speed interface. Various components are connected to each other by different buses and may be installed on a common main board or in other ways as required. The processor may process instructions executed within the communication device, including instructions stored in or on the memory to display graphical information of the GUI (graphical user interface) on an external input/output device (such as a display device coupled to an interface). In other implementations, a plurality of processors and/or a plurality of buses may be used together with a plurality of memories if desired. Similarly, a plurality of communication devices may be connected, and each device provides some necessary operations (for example, as a server array, a group of blade servers, or a multiprocessor system). In FIG. 15, a processor 1610 is taken as an example.

The memory 1620 is a non-transitory computer readable storage medium provided by the disclosure. The memory is configured to store instructions executed by at least one processor, to enable the at least one processor to execute the encoding method for CSI or the decoding method for CSI according to the disclosure. The non-transitory computer readable storage medium according to the disclosure is configured to store computer instructions. The computer instructions are configured to enable a computer to execute the encoding method for CSI or the decoding method for CSI according to the disclosure.

As the non-transitory computer readable storage medium, the memory 1620 may be configured to store non-transitory software programs, non-transitory computer executable programs and modules, such as program instructions/modules corresponding to the method in the embodiments of the disclosure. The processor 1610 is configured to execute various functional applications and data processing of the server by operating non-transitory software programs, instructions and modules stored in the memory 1620, that is, implements the encoding method for CSI or the decoding method for CSI according to the disclosure.

The memory 1620 may include a storage program region and a storage data region. The storage program region may store an application required by an operating system and at least one function. The storage data region may store data created according to usage of the communication device. In addition, the memory 1620 may include a high-speed random-access memory, and may also include a non-transitory memory, such as at least one disk memory device, a flash memory device, or other non-transitory solid-state memory device. In some embodiments, the memory 1620 may alternatively include memories remotely located to the processor 1610, and these remote memories may be connected to the communication device through a network. Examples of the above network include, but are not limited to, an Internet, an intranet, a local area network, a mobile communication network and combinations thereof.

The communication device may further include: an input device 1630 and an output device 1640. The processor 1610, the memory 1620, the input device 1630, and the output device 1640 may be connected through a bus or in other means. In FIG. 15, the bus is taken as an example.

The input device 1630 may receive inputted digital or character information, and generate key signal input related to user setting and function control of the communication device, such as a touch screen, a keypad, a mouse, a track pad, a touch pad, an indicator stick, one or more mouse buttons, a trackball, a joystick and other input device. The output device 1640 may include a display device, an auxiliary lighting device (e.g., LED), a haptic feedback device (such as, a vibration motor), and the like. The display device may include, but be not limited to, a liquid crystal display (LCD), a light emitting diode (LED) display, and a plasma display. In some embodiments, the display device may be the touch screen.

The various implementations of the system and techniques described herein may be implemented in a digital electronic circuit system, an integrated circuit system, an application specific ASIC (application specific integrated circuit), a computer hardware, a firmware, a software, and/or combinations thereof. These various implementations may include: being implemented in one or more computer programs. The one or more computer programs may be executed and/or interpreted on a programmable system including at least one programmable processor. The programmable processor may be a special purpose or general-purpose programmable processor, may receive data and instructions from a storage system, at least one input device, and at least one output device, and may transmit the data and the instructions to the storage system, the at least one input device, and the at least one output device.

These computing programs (also called programs, software, software applications, or codes) include machine instructions of programmable processors, and may be implemented by utilizing high-level procedures and/or object-oriented programming languages, and/or assembly/machine languages. As used herein, the terms "machine readable medium" and "computer readable medium" refer to any computer program product, device, and/or apparatus (such as, a magnetic disk, an optical disk, a memory, a programmable logic device (PLD)) for providing machine instructions and/or data to a programmable processor, including machine readable medium that receives machine instructions as a machine readable signal. The term "machine readable signal" refers to any signal for providing the machine instructions and/or data to the programmable processor.

To provide interaction with the user, the system and techniques described herein may be implemented on a computer. The computer has a display device (such as, a CRT (cathode ray tube) or an LCD (liquid crystal display) monitor) for displaying information to the user, a keyboard and a pointing device (such as, a mouse or a trackball), through which the user may provide the input to the computer. Other types of apparatus may also be configured to provide interaction with the user. For example, the feedback provided to the user may be any form of sensory feedback (such as, visual feedback, auditory feedback, or tactile feedback), and the input from the user may be received in any form (including acoustic input, voice input or tactile input).

The system and techniques described herein may be implemented in a computing system (such as, a data server) including a background component, a computing system (such as, an application server) including a middleware component, or a computing system including a front-end component (such as, a user computer having a graphical user interface or a web browser, through which the user may interact with embodiments of the system and techniques described herein), or a computing system including any combination of the background component, the middleware components, or the front-end component. Components of the system may be connected to each other through digital data communication in any form or medium (such as, a communication network). Examples of the communication network include a local area network (LAN), a wide area networks (WAN), the Internet, and a blockchain network.

The computer system may include a client and a server. The client and the server are generally remote from each other and usually interact through the communication network. A relationship between the client and the server is generated by computer programs operated on a corresponding computer and having a client-server relationship with each other.

Those skilled in the art may understand that all or part of the steps carried by the methods of the above embodiments may be completed by instructing the relevant hardware through programs, and the programs may be stored in a computer-readable storage medium. When the programs are executed, one or a combination of the steps in the method embodiments may be included.

In addition, each functional unit in each embodiment of the disclosure may be integrated into one processing module, or each unit may exist physically alone, or two or more units may be integrated into one module. The above-mentioned integrated modules may be implemented in the form of hardware or in the form of software function modules. If the integrated modules are implemented in the form of software functional modules and sold or used as independent products, they may also be stored in a computer-readable storage medium.

The above-mentioned storage medium may be a read-only memory, a magnetic disk, an optical disk, or the like.

The above are only the preferred embodiments of the disclosure. It should be pointed out that for those skilled in the art, without departing from the principles of the disclosure, several improvements and modifications may be made. It should be regarded as the protection scope of the disclosure.

What is claimed is:

1. An encoding method for channel state information (CSI), performed by a user equipment (UE), the method comprising:
   encoding, based on a first target CSI compression encoder, a target CSI matrix in a delay domain and an angle domain, to generate a compressed encoded value, wherein the first target CSI compression encoder comprises N composite convolution layers and one fully-connected layer, each composite convolution layer comprises a delay-domain convolution step and an angle-domain convolution step, and the delay-domain convolution step of a first composite convolution layer in the N composite convolution layers is smaller than the angle-domain convolution step of the first composite convolution layer in the N composite convolution layers, where N is a positive integer.

2. The method of claim 1, further comprising:
   obtaining the first target CSI compression encoder by training a CSI compression encoder based on real parts or imaginary parts of sample CSI matrices in the delay domain and the angle domain.

3. The method of claim 1, wherein the first composite convolution layer satisfies the following conditions:
   the delay-domain convolution step of the first composite convolution layer being smaller than a width of a convolution kernel in the first composite convolution layer; and
   the angle-domain convolution step of the first composite convolution layer being smaller than a number of input channels of the convolution kernel in the first composite convolution layer.

4. The method of claim 1, further comprising:
   obtaining an update CSI matrix in the delay domain and the angle domain, and updating the first target CSI compression encoder based on the update CSI matrix.

5. The method of claim 2, wherein encoding, based on the first target CSI compression encoder, the target CSI matrix in the delay domain and the angle domain, comprises:
   constructing a second target CSI compression encoder based on model parameters of the first target CSI compression encoder;
   extracting a real part and an imaginary part of the target CSI matrix; and
   inputting respectively the real part and the imaginary part of the target CSI matrix into respective corresponding target CSI compression encoders for encoding.

6. The method of claim 5, wherein inputting respectively the real part and the imaginary part of the target CSI matrix into respective corresponding target CSI compression encoders for encoding comprises:
   in response to the first target CSI compression encoder being an encoder trained based on the real parts of the sample CSI matrices, inputting the real part of the target CSI matrix into the first target CSI compression encoder for encoding and inputting the imaginary part of the target CSI matrix into the second target CSI compression encoder for encoding; or
   in response to the first target CSI compression encoder being an encoder trained based on the imaginary parts of the sample CSI matrices, inputting the imaginary part of the target CSI matrix into the first target CSI compression encoder for encoding and inputting the real part of the target CSI matrix into the second target CSI compression encoder for encoding.

7. The method of claim 1, wherein encoding, based on the first target CSI compression encoder, the target CSI matrix in the delay domain and the angle domain, comprises:
   extracting a real part and an imaginary part of the target CSI matrix and inputting sequentially the real part and the imaginary part of the target CSI matrix into the first target CSI compression encoder for encoding.

8. The method of claim 1, wherein an encoding process performed by the first target CSI compression encoder comprises:
   inputting a real part and/or an imaginary part of the target CSI matrix into the first composite convolution layer to obtain a tensor output by the first composite convolution layer;
   using a tensor output by a previous composite convolution layer as an input of a following composite convolution layer until an $N^{th}$ composite convolution layer; and
   reconstructing a tensor output by the $N^{th}$ composite convolution layer to obtain a reconstructed vector, and inputting the reconstructed vector into the fully-connected layer to generate the compressed encoded value;
   wherein each of the N composite convolution layers comprises a convolution layer, a batch normalization layer, and an activation function layer.

9. The method of claim 1, further comprising:
   performing a same zero-padding on an input of each composite convolution layer.

10. The method of claim 1, further comprising:
    obtaining a CSI matrix in a spatial-frequency domain, obtaining the target CSI matrix by performing a two-dimensional discrete Fourier transform (DFT) on the CSI matrix in the spatial-frequency domain, and performing a non-zero row principal value retention.

11. The method of claim 1, further comprising:
    sending the compressed encoded value to a network device.

12. A decoding method for channel state information (CSI), performed by a network device, the method comprising:
    receiving a compressed encoded value corresponding to a target CSI matrix in a delay domain and an angle domain from a UE; and
    decoding the compressed encoded value based on a first target CSI decoder to generate an estimated value of the target CSI matrix, wherein the first target CSI decoder comprises N composite deconvolution layers and one fully-connected layer, each composite deconvolution layer comprises a delay-domain convolution step and an angle-domain convolution step, and the delay-domain convolution step of an $N^{th}$ composite deconvolution layer in the N composite deconvolution layers is smaller than the angle-domain convolution step of the $N^{th}$ composite deconvolution layer in the N composite deconvolution layers, where N is a positive integer.

13. The method of claim 12, further comprising:
    receiving sample compressed encoded values from the UE, wherein the sample compressed encoded values are generated by the UE encoding real parts or imaginary parts of sample CSI matrices in the delay domain and the angle domain; and
    obtaining the first target CSI decoder by training a CSI decoder based on the sample compressed encoded values.

14. The method of claim 12, wherein the $N^{th}$ composite deconvolution layer satisfies the following conditions:
    the delay-domain convolution step of the $N^{th}$ composite deconvolution layer being smaller than a width of a convolution kernel of the $N^{th}$ composite deconvolution layer; and
    the angle-domain convolution step of the $N^{th}$ composite deconvolution layer being smaller than a number of input channels of the convolution kernel in the $N^{th}$ composite deconvolution layer.

15. The method of claim 12, further comprising:
    receiving an update compressed encoded value of an update CSI matrix in the delay domain and the angle domain from the UE, and updating the first target CSI decoder based on the update compressed encoded value.

16. The method of claim 13, wherein the compressed encoded value comprises a first compressed encoded value of a real part of the target CSI matrix and a second compressed encoded value of an imaginary part of the target CSI matrix, and decoding the compressed encoded value based on the first target CSI decoder comprises:
    constructing a second target CSI decoder based on model parameters of the first target CSI decoder; and
    inputting respectively the first compressed encoded value and the second compressed encoded value into respective corresponding target CSI decoders for decoding;
    wherein inputting respectively the first compressed encoded value and the second compressed encoded value into respective corresponding target CSI decoders for decoding comprises:
    in response to the first target CSI decoder being a decoder trained based on the real parts of the sample CSI matrices, inputting the first compressed encoded value into the first target CSI decoder for decoding and inputting the second compressed encoded value into the second target CSI decoder for decoding; or
    in response to the first target CSI decoder being a decoder trained based on the imaginary parts of the sample CSI matrices, inputting the first compressed encoded value into the second target CSI decoder for decoding and inputting the second compressed encoded value into the first target CSI decoder for decoding.

17. The method of claim 12, wherein the compressed encoded value comprises a first compressed encoded value of a real part of the target CSI matrix and a second compressed encoded value of an imaginary part of the target CSI matrix, and decoding the compressed encoded value based on the first target CSI decoder comprises:
   inputting sequentially the first compressed encoded value and the second compressed encoded value into the first target CSI decoder for decoding.

18. The method of claim 12, wherein a decoding process performed by the first target CSI decoder comprises:
   inputting the compressed encoded value into the fully-connected layer to output a vector and reconstructing the vector to generate a first tensor;
   inputting the first tensor to a first composite deconvolution layer to obtain a second tensor; and
   using a tensor output by a previous composite deconvolution layer as an input of a following composite deconvolution layer until the $N^{th}$ composite deconvolution layer, wherein an output of the $N^{th}$ composite deconvolution layer is the estimated value of the target CSI matrix;
   wherein each of the N composite deconvolution layers comprises a deconvolution layer, a batch normalization layer, and an activation function layer.

19. The network device comprising:
a processor; and
a memory communicatively coupled to the processor and for storing instructions executable by the processor; wherein,
the processor is configured to perform the method of claim 12.

20. A user equipment (UE), comprising:
a processor; and
a memory communicatively coupled to the processor and for storing instructions executable by the processor; wherein,
the processor is configured to:
encode, based on a first target channel state information (CSI) compression encoder, a target CSI matrix in a delay domain and an angle domain, to generate a compressed encoded value, wherein the first target CSI compression encoder comprises N composite convolution layers and one fully-connected layer, each composite convolution layer comprises a delay-domain convolution step and an angle-domain convolution step, and the delay-domain convolution step of a first composite convolution layer in the N composite convolution layers is smaller than the angle-domain convolution step of the first composite convolution layer in the N composite convolution layers, where N is a positive integer.

* * * * *